United States Patent
Hiraoka et al.

(10) Patent No.: US 8,308,597 B2
(45) Date of Patent: Nov. 13, 2012

(54) SPEED CHANGE TRANSMISSION SYSTEM

(75) Inventors: Minoru Hiraoka, Osakasayama (JP); Satoshi Machida, Sakai (JP); Yoshiyuki Katayama, Osaka (JP)

(73) Assignee: Kubota Corporation, Osaka (JP)

( * ) Notice: Subject to any disclaimer, the term of this patent is extended or adjusted under 35 U.S.C. 154(b) by 554 days.

(21) Appl. No.: 12/440,083

(22) PCT Filed: Mar. 19, 2008

(86) PCT No.: PCT/JP2008/055075
§ 371 (c)(1),
(2), (4) Date: Jun. 11, 2009

(87) PCT Pub. No.: WO2009/037877
PCT Pub. Date: Mar. 26, 2009

(65) Prior Publication Data
US 2010/0184551 A1 Jul. 22, 2010

(30) Foreign Application Priority Data

Sep. 20, 2007 (JP) .................. 2007-244276
Sep. 20, 2007 (JP) .................. 2007-244277

(51) Int. Cl.
*F16H 47/04* (2006.01)
*F16H 37/02* (2006.01)
(52) U.S. Cl. ......................... 475/80; 475/219
(58) Field of Classification Search ............ 475/72, 475/80, 81, 82, 83, 207, 218, 219, 302
See application file for complete search history.

(56) References Cited

U.S. PATENT DOCUMENTS

| 4,682,511 A * | 7/1987 | Wittke .......................... 475/218 |
| 5,248,283 A | 9/1993 | Eckhardt et al. |
| 5,643,122 A * | 7/1997 | Fredriksen ..................... 475/80 |
| 6,042,496 A * | 3/2000 | Lehle et al. .................... 475/81 |
| 2003/0226416 A1 | 12/2003 | Umemoto et al. |
| 2006/0276290 A1 | 12/2006 | Fabry et al. |
| 2008/0214351 A1 | 9/2008 | Katayama et al. |

FOREIGN PATENT DOCUMENTS

| EP | 0450282 A2 * | 2/1991 |
| JP | 2003343712 A | 12/2003 |
| JP | 2007092949 A | 4/2007 |
| WO | 2007040076 A1 | 4/2007 |

OTHER PUBLICATIONS

English Translation of EP0450282A2, Mar. 23, 2012, http://translationportal.epo.org.*

* cited by examiner

*Primary Examiner* — Roger Pang
(74) *Attorney, Agent, or Firm* — The Webb Law Firm

(57) ABSTRACT

In order to provide a speed change transmission system which can be obtained compactly, while obtaining output at steplessly varied speeds over a large speed change range only by carrying out a simple shifting operation, the speed change transmission system has a hydrostatic stepless transmission to which engine drive is inputted. A planetary transmission device (P) has a plurality of planetary transmission mechanisms, for combining output of the stepless transmission and engine drive not undergoing speed change action by the hydrostatic stepless transmission. A plurality of transmission shafts are provided with a plurality of speed range setting clutches switchable for converting the combined driving force from the planetary transmission device (P) to a driving force in a plurality speed ranges, and transmitting it to an output rotary member. The plurality of transmission shafts are juxtaposed and arranged in parallel.

17 Claims, 13 Drawing Sheets

|  | first clutch 101 | second clutch 102 | third clutch 103 | fourth clutch 104 | odd number range transmission clutch 107 | even number range transmission clutch 108 |
|---|---|---|---|---|---|---|
| first speed range | ON | — | — | — | ON | — |
| second speed range | — | ON | — | — | — | ON |
| third speed range | — | — | ON | — | ON | — |
| fourth speed range | — | — | — | ON | — | ON |

Fig.7

|  | first clutch 101 | second clutch 102 | third clutch 103 | fourth clutch 104 | rotation of output shaft (30) |
|---|---|---|---|---|---|
| first speed range → second speed range | ON | ON | — | — | inc |
| second speed range → third speed range | — | ON | ON | — | inc |
| third speed range → fourth speed range | — | — | ON | ON | inc |
| fourth speed range → third speed range | — | — | ON | ON | dec |
| third speed range → second speed range | — | ON | ON | — | dec |
| second speed range → first speed range | — | ON | — | — | dec |

SPEED CHANGE TRANSMISSION SYSTEM

TECHNICAL FIELD

The present invention relates to a speed change transmission system, and more particularly to a speed change transmission system having a hydrostatic stepless transmission to which engine drive is inputted, and a planetary transmission device having a plurality of planetary transmission mechanisms for combining output of the hydrostatic stepless transmission and the engine drive not undergoing change speed action by the hydrostatic stepless transmission, wherein a combined driving force from the planetary transmission device is stage-divided into a plurality of speed ranges, and each stage of speed range is put to stepless speed changing to be outputted from an output rotary member.

BACKGROUND ART

In the above change speed transmission system, the stepless transmission is shiftable to stage-divide a combined driving force of engine output and the output of the stepless transmission or a combined driving force of engine output and the output of an electric motor into a plurality of speed ranges, and to output a driving force resulting from each speed range subjected to stepless speed changing. When this is used in driving a travel device, change speed transmission is realized advantageously, such as smoothing traveling speed changes, and simplifying shifting operations.

As this type of change speed transmission system, what is described in Patent Document 1 has been developed previously. While embodiments in Patent Document 1 are described hereinafter in order to facilitate understanding of the present invention, this is not necessarily an acknowledgement that Patent Document 1 constitutes prior art providing a basis for determining novelty or obviousness of the present invention.

In Patent Document 1, three types of speed change transmission system are described. One of the three speed change transmission systems (what is illustrated in FIG. 2 of Patent Document 1) includes a stepless transmission, a planetary transmission device, a clutch device, a third planetary transmission mechanism, and a brake for acting on the third planetary transmission mechanism.

The stepless transmission has a hydraulic pump of the variable displacement type with a pump shaft interlocked to an engine output shaft through a main clutch, and a hydraulic motor driven by pressure oil from this hydraulic pump.

The planetary transmission device has a first planetary transmission mechanism and a second planetary transmission mechanism. Planet gears of the first planetary transmission mechanism and planet gears of the second planetary transmission mechanism are interlocked by engagement between interlocking gear portions provided on the respective planet gears. The planet gears of the first planetary transmission mechanism and the planet gears of the second planetary transmission mechanism are supported by a carrier common to the first planetary transmission mechanism and second planetary transmission mechanism.

The clutch device has a first clutch, a second clutch, a third clutch and a fourth clutch. The first clutch has an input side rotary member interlocked to a ring gear of the second planetary transmission mechanism through an interlocking mechanism. The second clutch has an input side rotary member interlocked to a sun gear of the second planetary transmission mechanism through a rotary shaft. The third clutch has an input side rotary member interlocked to a carrier of the planetary transmission device through an interlocking mechanism.

The interlocking mechanism interlocking the input side rotary member of the first clutch and the ring gear of the second planetary transmission mechanism has a clutch side transmission gear meshed with the input side rotary member of the first clutch, a planetary side transmission gear meshed with the ring gear of the second planetary transmission mechanism, and a rotary shaft connected to the clutch side transmission gear and planetary side transmission gear. The interlocking mechanism interlocking the input side rotary member of the third clutch and the carrier of the planetary transmission device has a clutch side transmission gear meshed with the input side rotary member of the third clutch, a planetary side transmission gear meshed with the carrier, and a rotary shaft connected to the clutch side transmission gear and planetary side transmission gear.

The sun gear of the third planetary transmission mechanism is interlocked to an output side rotary member of the first clutch and second clutch, and the input side rotary member of the third clutch. The carrier of the third planetary transmission mechanism is interlocked to an output side rotary member of the third clutch and fourth clutch.

The brake is switchable between an engaged state for exerting braking action on the ring gear of the third planetary transmission mechanism, and a disengaged state for canceling the braking action on the ring gear.

With the speed change transmission system illustrated in FIG. 2 of Cited Document 1, output of the stepless transmission and the driving force of the pump shaft of the stepless transmission (engine drive not undergoing change speed action by the stepless transmission) are combined by the planetary transmission device. By shifting the stepless transmission, and by properly switching the first to fourth clutches and the brake between engaged state and disengaged state in timed relationship with the shifting operation, the combined driving force outputted from the planetary transmission device is stage-divided into a first speed range to a fourth speed range, and each speed range is put through stepless speed changing to be outputted from a carrier shaft of the third planetary transmission mechanism.

Another one (what is illustrated in FIG. 12 of Patent Document 1) and the other (what is illustrated in FIG. 16 of Patent Document 1) of the three speed change transmission systems described in Patent Document 1 have a stepless transmission, a planetary transmission device, a clutch device and an auxiliary change speed device.

The stepless transmission and planetary transmission device have the same constructions as the stepless transmission and planetary transmission device of the speed change transmission system illustrated in FIG. 2 of Patent Document 1.

The clutch device has a first clutch and a second clutch. The first clutch has an input side rotary member interlocked to the ring gear of the second planetary transmission mechanism of the planetary transmission device through an interlocking mechanism. The interlocking mechanism has a planetary side transmission gear meshed with the ring gear of the second planetary transmission mechanism, a clutch side transmission gear meshed with a gear portion of the input side rotary member of the first clutch, and a rotary interlocking shaft connected to the planetary side transmission gear and clutch side transmission gear.

The auxiliary change speed device has a high-speed clutch and a low-speed clutch. In the auxiliary change speed device illustrated in FIG. 16 of Patent Document 1, the high-speed clutch and low-speed clutch are dog clutches.

With the speed change transmission systems illustrated in FIG. 12 and FIG. 16 of Cited Document 1, output of the stepless transmission and the driving force of the pump shaft of the stepless transmission (engine drive not undergoing change speed action by the stepless transmission) are combined by the planetary transmission device. By shifting the stepless transmission, and by properly switching the first clutch, second clutch, high-speed clutch and low-speed clutch between engaged state and disengaged state in timed relationship with the shifting operation, the combined driving force outputted from the planetary transmission device is stage-divided into a first speed range to a fourth speed range, and each speed range is put through stepless speed changing to be outputted from an output shaft of the auxiliary change speed device.

In the case of a speed change transmission system employing the above conventional technique, the first to fourth clutches, or the first and second clutches and the high-speed and low-speed clutches, provided for stage-dividing the combined driving force from the planetary transmission device into a plurality of speed ranges for transmission to the output rotary member are arranged in the fore and aft direction of a transmission case, and tend to be large in the fore and aft direction of the transmission case.

Another problem of the conventional speed change transmission system is power cutting accompanying a shifting operation. A conventional speed change structure that can inhibit the power cutting accompanying a shifting operation is described in Patent Document 2.

The speed change transmission system described in Patent Document 2 has a first transmission line and a second transmission line arranged in parallel between a transmission shaft located upstream with respect to transmission for receiving engine power (hereinafter called the upstream transmission shaft) and a transmission shaft located downstream with respect to transmission for transmitting power to a travel device (hereinafter called the upstream transmission shaft). A transmission clutch of the hydraulic multi-plate type is disposed downstream of the first and second transmission lines. Between the upstream transmission shaft and first transmission line is a first gear speed change mechanism having a plurality of speed positions, and the first transmission line includes a first friction clutch. Between the upstream transmission shaft and second transmission line is a second gear speed change mechanism having a plurality of speed positions, and the second transmission line includes a second friction clutch. Between the first transmission line and downstream transmission shaft is a first auxiliary gear speed change mechanism having a plurality of speed positions. Between the second transmission line and downstream transmission shaft is a second auxiliary gear speed change mechanism having a plurality of speed positions.

The first gear speed change mechanism has a shift member operable by a first actuator, and the second gear speed change mechanism has a shift member operable by a second actuator. The first auxiliary gear speed change mechanism has a shift member operable by a first auxiliary actuator, and the second gear speed change mechanism has a shift member operable by a second auxiliary actuator.

The first actuator, first auxiliary actuator, second actuator and second auxiliary actuator are linked to a control device. The control device, based on a result of detection of a control position of the shift lever and a speed change mode selected by a setting switch, operates the first actuator to shift the first gear speed change mechanism, operates the second actuator to shift the second gear speed change mechanism, operates the first auxiliary actuator to shift the first auxiliary gear speed change mechanism, and operates the second auxiliary actuator to shift the second auxiliary gear speed change mechanism.

In a state where the shift lever is operated to one of a first speed position to an eighth speed position, the first gear speed change mechanism, first auxiliary gear speed change mechanism, second gear speed change mechanism and second auxiliary gear speed change mechanism are operated to a speed change state corresponding to the operated position of the shift lever. The power of the upstream transmission shaft is transmitted to the downstream transmission shaft through one of the first and second transmission lines.

When, for example, a second speed change mode is selected and the shift lever is operated from the first speed position to the fifth speed position, in the first half of speed change control accompanying this shifting operation, a double transmission state occurs in which power is transmitted to the downstream transmission shaft in a state where the shift member of the first gear speed change mechanism is in a first speed position, and simultaneously therewith and in addition thereto power is transmitted to the downstream transmission shaft in a state where the shift member of the second gear speed change mechanism is in a second speed position. In the second half of the speed change control, a double transmission state occurs in which power is transmitted to the downstream transmission shaft in a state where the shift member of the second gear speed change mechanism is in a second speed position, and simultaneously therewith and in addition thereto power is transmitted to the downstream transmission shaft in a state where the shift member of the first gear speed change mechanism is in a third speed position.

Even if torque variations arise in the double transmission states, the torque variations are absorbed by the transmission clutch in a half-transmission state slipping to some extent.

When speed changing is realized while inhibiting the power cutting by employing the above conventional technique, torque variations in the double transmission states are absorbed by slips of the friction clutches and transmission clutch. Then, when the double transmission states occur, it has been necessary to weaken operating forces that pressurize the friction clutches and transmission clutch to the half-transmission state, so that slips of the friction clutches and transmission clutch occur conveniently, thereby reliably avoiding damage to the transmission case and others. That is, a transmission loss in the double transmission states has tended to become large.

Patent Document 1:
Unexamined Patent Publication No. 2007-92949
Patent Document 2:
Unexamined Patent Publication No. 2003-343712

DISCLOSURE OF THE INVENTION

The object of this invention is to provide an improved speed change transmission system.

According to an embodiment of this invention, a speed change transmission system has a hydrostatic stepless speed change device for receiving engine drive; and a planetary transmission device having a plurality of planetary transmission mechanisms for combining output of the hydrostatic stepless speed change device and the engine drive not undergoing a speed change action by the hydrostatic stepless speed change device; a combined driving force from the planetary transmission device being stage-divided into a plurality of speed ranges, and subjected to stepless speed changing at each speed range for output from an output rotary member; the speed change transmission system comprising a first output gear interlocked to the planetary transmission device; a first input gear meshed with the first output gear; a first transmission shaft for supporting the first input gear; a first speed range setting clutch corresponding to the first transmission shaft, and having a first state for fixing the first input gear to the first transmission shaft, and a second state for allowing rotation of the first input gear relative to the first transmission shaft; a second output gear interlocked to the planetary transmission device; a second input gear meshed with the second output gear; a second transmission shaft for supporting the second input gear; and a second speed range setting clutch corresponding to the second transmission shaft, and having a first state for fixing the second input gear to the second transmission shaft, and a second state for allowing rotation of the second input gear relative to the second transmission shaft; wherein the first and second transmission shafts are juxtaposed and arranged in parallel for selectively transmitting drive to the output rotary member.

According to such construction, when the plurality of speed range setting clutches are switched appropriately in response to a shifting operation of the hydrostatic stepless transmission, the combined driving force from the planetary transmission device is stage-divided into a plurality of speed ranges, and is subjected to stepless speed changing in each speed range to be transmitted to the output rotary member. In order to carry out transmission from the planetary transmission device to the output rotary member through a transmission shaft corresponding to a speed range of this transmission, a plurality of transmission shafts including at least the first and second transmission shafts are provided. Since at least the first and second transmission shafts are juxtaposed and arranged in parallel, this part of the transmission system can be reduced to a size smaller than the conventional speed change transmission system in the fore and aft direction of the transmission case.

Therefore, output at steplessly varied speeds over a large speed change range can be obtained by carrying out a simple shifting operation consisting of shifting of the stepless transmission. Yet, the size in the fore and aft direction of the transmission case is made small and compact. The speed change transmission system obtained is easy to use, e.g. easy to mount in small vehicles also.

Preferably, the embodiment of this invention further comprises a third output gear interlocked the planetary transmission device; a third input gear supported on the first transmission shaft and meshed with the third output gear; a fourth output gear interlocked to the planetary transmission device; a fourth input gear supported on the second transmission shaft and meshed with the fourth output gear; wherein the first speed range setting clutch has a third state for fixing the third input gear to the first transmission shaft, and a fourth state for allowing rotation of the third input gear relative to the first transmission shaft; and the second speed range setting clutch has a third state for fixing the fourth input gear to the second transmission shaft, and a fourth state for allowing rotation of the fourth input gear relative to the second transmission shaft.

With this construction, a speed change transmission system can be provided which has at least four speed ranges by using two transmission shafts.

The above construction is applicable to a speed change transmission system having three or more transmission shafts.

Specifically, it is preferred that the embodiment of this invention comprises at least three transmission shafts including the first and second transmission shafts, having corresponding gear pairs and corresponding speed range setting clutches, and interlockable to the planetary transmission device through the gear pairs and the speed range setting clutches, wherein the at least three second transmission shafts are juxtaposed and arranged in parallel for selectively transmitting drive to the output rotary member.

In the embodiment of this invention, preferably, the planetary transmission device includes a pair of planetary transmission mechanisms having planet gears meshed with each other; and the first and second transmission shafts are juxtaposed over entire lengths thereof.

With this construction, since the first and second transmission shafts are juxtaposed over the entire lengths thereof, the length of the transmission from the planetary transmission device to the output rotary member can be reduced in the fore and aft direction of the transmission case, compared with these transmission shafts being arranged in parallel and staggered in the fore and aft direction of the transmission case.

In the embodiment of this invention, preferably, each of the first and second speed range setting clutches is a claw clutch.

With this construction, since the speed range setting clutches are claw clutches, the speed range setting clutches can be made lightweight and compact, compared with employing friction clutches as the speed range setting clutches.

In the embodiment of this invention, preferably, each of the claw clutches is hydraulically operable.

Being hydraulically operable enables a subtle operation.

In an embodiment of this invention, each of the first transmission shaft and the second transmission shaft has a friction clutch mounted thereon, thereby allowing a selective transmission of drive from one of the first transmission shaft and the second transmission shaft to the output rotary member.

With this construction, when switching between the first transmission shaft and the second range transmission shaft, for example, a double transmission state can be produced where the driving forces from these transmission shafts are simultaneously transmitted to the output rotary member. This can produce slips of the clutches to absorb torque variations.

According to an embodiment of this invention, a speed change transmission system has a hydrostatic stepless transmission for receiving engine drive; and a planetary transmission device having a plurality of planetary transmission mechanisms for combining output of the hydrostatic stepless transmission and the engine drive not undergoing a speed change action by the hydrostatic stepless transmission; a combined driving force from the planetary transmission device being stage-divided into a plurality of speed ranges, and subjected to stepless speed changing at each speed range for output from an output rotary member; the speed change transmission system comprising a first output gear interlocked to the planetary transmission device; a first input gear meshed with the first output gear; a first transmission shaft for supporting the first input gear; a first speed range setting clutch corresponding to the first transmission shaft, and having a first state for fixing the first input gear to the first transmission shaft, and a second state for allowing rotation of the first input gear relative to the first transmission shaft; a second output gear interlocked to the planetary transmission device; a second input gear meshed with the second output gear; a second transmission shaft for supporting the second input gear; and a second speed range setting clutch corresponding to the second transmission shaft, and having a first state for fixing the second input gear to the second transmission shaft, and a second state for allowing rotation of the second input gear relative to the second transmission shaft; wherein the first output gear and the first input gear have a gear ratio for forming a first speed range; and the second output gear and the second input gear have a gear ratio for forming a second speed range continuous with the first speed range and faster than the first speed range.

According to such construction, when the hydrostatic stepless transmission is shifted and the plurality of speed range setting clutches are switched appropriately in response to this shifting operation, the driving force outputted from the planetary transmission device is stage-divided into a plurality of speed ranges, and is subjected to stepless speed changing in each speed range to be transmitted to the output rotary member.

At a time of a speed range switching shifting operation for switching from one to the other of an odd number speed range such as the first speed range and an even number speed range such as the second speed range (hereinafter called inter-range speed change), switching is made from one to the other of a state where the driving force from the planetary transmission device is transmitted to the output rotary member through the first transmission shaft and a state where it is transmitted to the output rotary member through the second transmission shaft. Therefore, when, with an increase in speed, a change is made from one speed range to a faster (or slower) speed range speed, the speed change transmission system provided can use a different transmission shaft.

The embodiment of this invention, preferably, further comprises a third output gear interlocked the planetary transmission device; a third input gear supported on the first transmission shaft and meshed with the third output gear; a fourth output gear interlocked to the planetary transmission device; a fourth input gear supported on the second transmission shaft and meshed with the fourth output gear; wherein the first speed range setting clutch has a third state for fixing the third input gear to the first transmission shaft, and a fourth state for allowing rotation of the third input gear relative to the first transmission shaft; the second speed range setting clutch has a third state for fixing the fourth input gear to the second transmission shaft, and a fourth state for allowing rotation of the fourth input gear relative to the second transmission shaft; the third output gear and the third input gear have a gear ratio for forming a third speed range continuous with the second speed range and faster than the second speed range; and the fourth output gear and the fourth input gear have a gear ratio for forming a fourth speed range continuous with the third speed range and faster than the third speed range.

This construction can provide four speed ranges.

The embodiment of this invention, preferably, further comprises a shift detecting device for detecting a shift position of the hydrostatic stepless transmission; and a control device for switching each of the speed range setting clutches based on detection information by the shift detecting device, such that, in response to the shift position of the hydrostatic stepless transmission, the combined driving force from the planetary transmission device is stage-divided into the plurality of speed ranges, and subjected to stepless speed changing at each speed range for output from the output rotary member; wherein the control device is constructed to switch the first and second speed range setting clutches such that a speed range switching operation goes through a switching stage where the first speed range setting clutch mounted on the first transmission shaft and the second speed range setting clutch mounted on the second transmission shaft are both engaged.

That is, a shifting operation goes through a switching stage where the first speed range setting clutch mounted on the first transmission shaft and the second speed range setting clutch mounted on the second transmission shaft are both engaged. Specifically, before one of an odd number transmission line with the first transmission shaft and an even number transmission line with the second transmission shaft which transmit the driving force from the planetary transmission device to the output rotary member is switched to a disengaged state, the other is switched to an engaged state, and after the other is switched to the engaged state, the one is switched to the disengaged state. Thus, speed is changed through a double transmission state to prevent a break in the transmission to the output rotary member.

Thus, torque variations are effectively absorbed by the double transmission state of the clutches.

In an embodiment of this invention, preferably, the first transmission shaft has a fifth output gear; the second transmission shaft has a sixth output gear; the output rotary member has a fifth input gear meshed with the fifth gear and the sixth gear; the number of rotations is reduced between the third output gear and the third input gear and between the fifth output gear and the said fifth input gear; and gear ratios of the respective gears are set such that the number of rotations is reduced between the fourth output gear and the fourth input gear, and in a gear ratio of the sixth output gear and the fifth input gear.

With this construction, in transmitting the driving force of the third output gear to the output rotary member deceleration is made in two places, i.e. between the third output gear and first transmission shaft and between the fifth output gear and output rotary member. Similarly, in transmitting the driving force of the fourth output gear to the output rotary member deceleration is made in two places, i.e. between the fourth output gear and second transmission shaft and between the sixth output gear and output rotary member. This realizes a reduced space between the transmission shafts, and deceleration may be carried out without enlarging the portion of the gear mechanisms which set the speed ranges.

In an embodiment of this invention, preferably, the gear ratios are set to increase the number of rotations between the first output gear and the first input gear; and increase the number of rotations between the second output gear and the second input gear.

With this construction, it is assumed that gear ratios are set such that, for example, the number of rotations is increased to twice between the first output gear and first input gear, and the number of rotations is decreased to one half each between the third output gear and third input gear and between the fifth output gear and fifth input gear. By transmitting the driving force through the first output gear and first input gear and through the fifth output gear and fifth input gear, the driving force can be transmitted with reduction ratio 1, i.e. in a state of no reduction. By transmitting the driving force through the third output gear and third input gear and through the fifth output gear and fifth input gear, the driving force can be transmitted with the number of rotations reduced to one fourth.

On the other hand, in Patent Document 1 noted hereinbefore, one of the planetary mechanisms having a ring gear brake (third planetary transmission mechanism) reduces a rotating speed to one fourth with the ring gear brake engaged, and transmits the rotating speed without change with the ring gear brake released. Therefore, the above embodiment can obtain desired reduction ratios without using a complicated planetary mechanism having a brake.

The embodiment of this invention is not limited to two transmission shafts having the speed range setting clutches, but may include three or more.

That is, one embodiment, preferably comprises at least three transmission shafts including the first and second transmission shafts, having corresponding gear pairs and corresponding speed range setting clutches, and interlockable to the planetary transmission device, wherein the at least three second transmission shafts are juxtaposed and arranged in parallel for selectively transmitting drive to the output rotary member.

As in the embodiment of this invention, claws clutches engageable by hydraulic pressurization are used as the speed range setting clutches when a double transmission state is produced, or friction clutches are used on the first transmission shaft and second transmission shaft when claws clutches are used as the speed range setting clutches, to absorb torque variations in the double transmission state by slipping of the clutches. Besides absorbing torque variations in the double transmission state by the clutches, the hydrostatic stepless transmission absorbs the torque variations effectively by slipping of pressure oil. Absorption of the torque variations in the double transmission state is carried out effectively even when a relatively strong operating force pressurizes each clutch to a half-transmission state at the time of the double transmission state.

Therefore, also when stepless speed changing is carried out in each speed range and also when an inter-range speed changing is carried out, a break in transmission to the output rotary member does not easily occur. Moreover, high transmission efficiency of the clutches operated to the half-transmission state is achieved at the time of inter-range speed changing. The speed change transmission system provided can enable a smooth shifting operation with little chance of power break or transmission loss.

BRIEF DESCRIPTION OF THE DRAWINGS

FIG. 7 is an explanatory view of clutch operating states by a control device at times of speed range switching;

BEST MODE FOR CARRYING OUT THE INVENTION

Embodiments of this invention will be described hereinafter with reference to the drawings.

Figure 1:
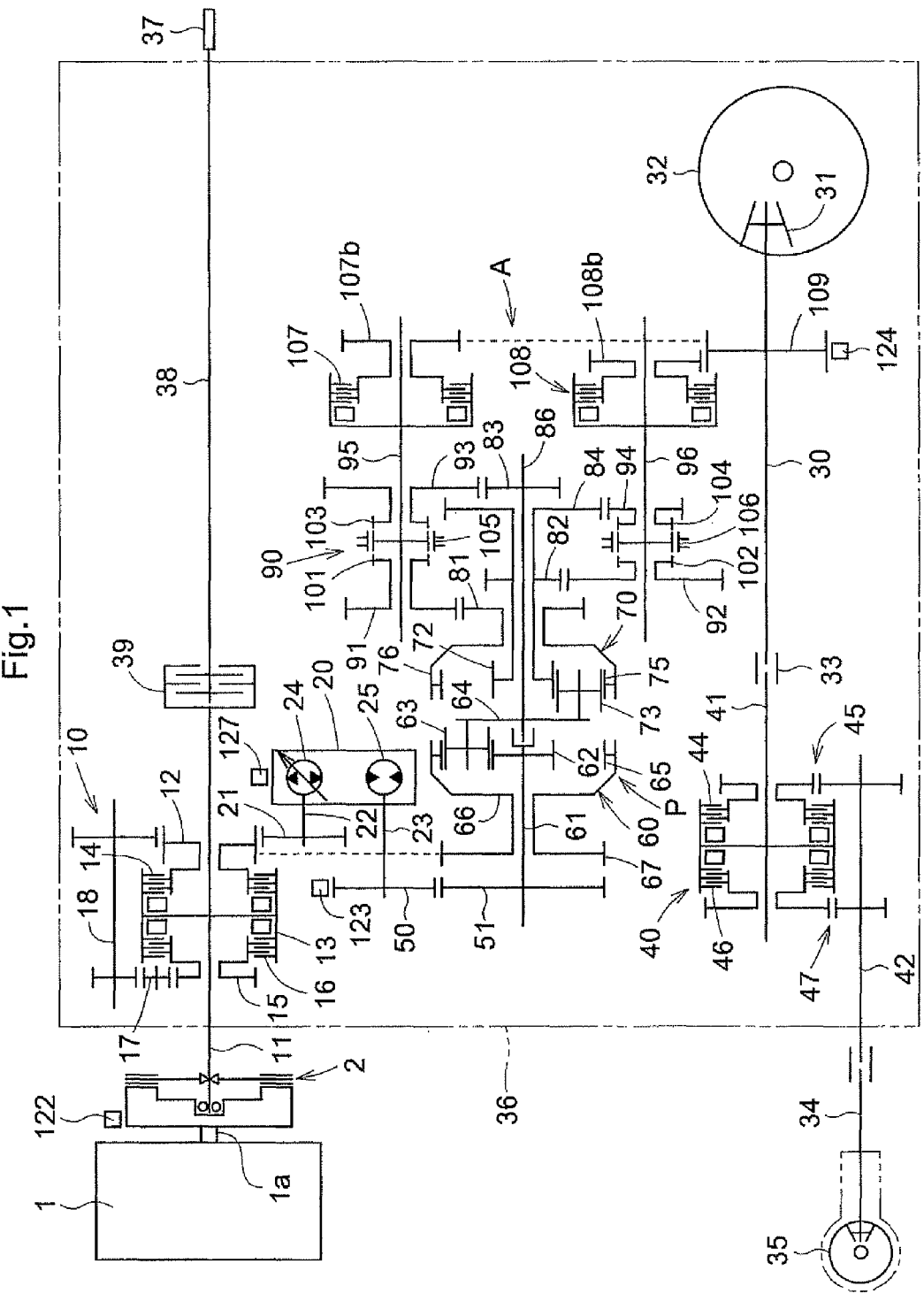
FIG. 1 is a line map of a traveling transmission system of a tractor equipped with a speed change transmission system in a first embodiment.

FIG. 1 is a line map of a traveling transmission system of a tractor equipped with a speed change transmission system A in a first embodiment of this invention. As shown in this figure, the traveling transmission system of the tractor includes a main clutch 2 which receives output from an output shaft 1a of an engine 1, a forward and backward changeover device 10 which receives output of the main clutch 2 through an input shaft 11, the speed change transmission system A according to the first embodiment of this invention which has an input shaft 22 interlocked through a gear 21 to an output gear 12 of the forward and backward changeover device 10, a rear wheel differential mechanism 32 which has an input gear 31 connected to a rear end of an output shaft 30 acting as an output rotary member of the speed change transmission system A to be rotatable together, a front wheel change speed device 40 which has an input shaft 41 connected a through a joint 33 to a forward end of the output shaft 30 to be rotatable together, and a front wheel differential mechanism 35 which receives output from an output shaft 42 of the front wheel change speed device 40 through a rotary transmission shaft 34.

The forward and backward changeover device 10, speed change transmission system A, rear wheel differential mechanism 32 and front wheel change speed device 40 are housed in the same transmission case 36

As shown in FIG. 1, a power takeoff shaft 37 projecting rearward from the transmission case 36 serves to transmit a driving force to various types of working implements such as a rotary plow connected to the tractor. This power takeoff shaft 37 is interlocked with the input shaft 11 of the forward and backward changeover device 10 through an interlocking shaft 38 and a working clutch 39.

As shown in FIG. 1, the forward and backward changeover device 10 includes, besides the input shaft 11 and output gear 12, an input side rotary member 13 mounted on the input shaft 11 to be rotatable together, and a forward drive friction clutch 14 of the multi-plate type mounted between one end of the input side rotary member 13 and the output gear 12. The forward and backward changeover device 10 further includes a transmission gear 15 located opposite the output gear 12 across the input side rotary member 13 and supported to be rotatable relative to the input shaft 11, a backward drive friction clutch 16 of the multi-plate type mounted between the transmission gear 15 and the other end of the input side rotary member 13, a reversing gear 17 meshed with the transmission gear 15, and an interlocking shaft 18 for interlocking the reversing gear 17 to the output gear 12.

The forward and backward changeover device 10 is placed in a forward drive state when an operating hydraulic pressure is supplied to a forward drive piston, of the forward drive piston and a backward drive piston provided inside the input side rotary member 13, whereby the forward drive piston pressurizes the forward drive friction clutch 14 into an engaged state, and is placed in a backward drive state when the operating hydraulic pressure is supplied to the backward drive piston whereby the backward drive piston pressurizes the backward drive friction clutch 16 into an engaged state.

When the forward and backward changeover device 10 is in the forward drive state, the driving force of the input shaft 11 is converted into a forward driving force through the input side rotary member 13, forward drive friction clutch 14 and output gear 12 to be outputted from the output gear 12 to a stepless transmission 20 and a planetary transmission device P. When the forward and backward changeover device 10 is in the backward drive state, the driving force of the input shaft 11 is converted into a backward driving force through the input side rotary member 13, backward drive friction clutch 16, transmission gear 15, reversing gear 17 and transmission shaft 18, which is transmitted to the output gear 12 and outputted from the output gear 12 to the stepless transmission 20 and planetary transmission device P.

As shown in FIG. 1, the speed change transmission system A in the first embodiment of this invention includes, besides the input shaft 22 and output shaft 30, the stepless transmission 20, the planetary transmission device P having a sun gear shaft 61 interlocked to a motor shaft 23 of the stepless transmission 20 through a gear 50 and a gear 51, and a speed range setter 90 having a first input gear 91 meshed with a first output gear 81 of the planetary transmission device P.

As shown in FIG. 1, the stepless transmission 20 includes a hydraulic pump 24 of the axial plunger type and variable displacement type having the input shaft 22 as a pump shaft (the input shaft being hereinafter called the pump shaft 22), and a hydraulic motor 25 of the axial plunger type driven by pressure oil from the hydraulic pump 24. The hydraulic motor 25 has the motor shaft 23.

That is, the stepless transmission 20 is a hydrostatic stepless transmission switchable to a forward rotational transmission state, a neutral state, and a reverse rotational transmission state by changing a swash plate angle of the hydraulic pump 24. The stepless transmission 20, with the swash plate angle of the hydraulic pump 24 changed in the forward rotational transmission state, converts the engine drive force transmitted to the pump shaft 22 through the forward and backward changeover device 10 into a driving force in a direction of forward rotation, and changes its speed steplessly for output from the motor shaft 23. The stepless transmission 20, with the swash plate angle of the hydraulic pump 24 changed in the reverse rotational transmission state, converts the engine drive force transmitted to the pump shaft 22 through the forward and backward changeover device 10 into a driving force in a direction of reverse rotation, and changes its speed steplessly for output from the motor shaft 23. The stepless transmission 20, in the neutral state, stops output from the motor shaft 23.

Figure 2:
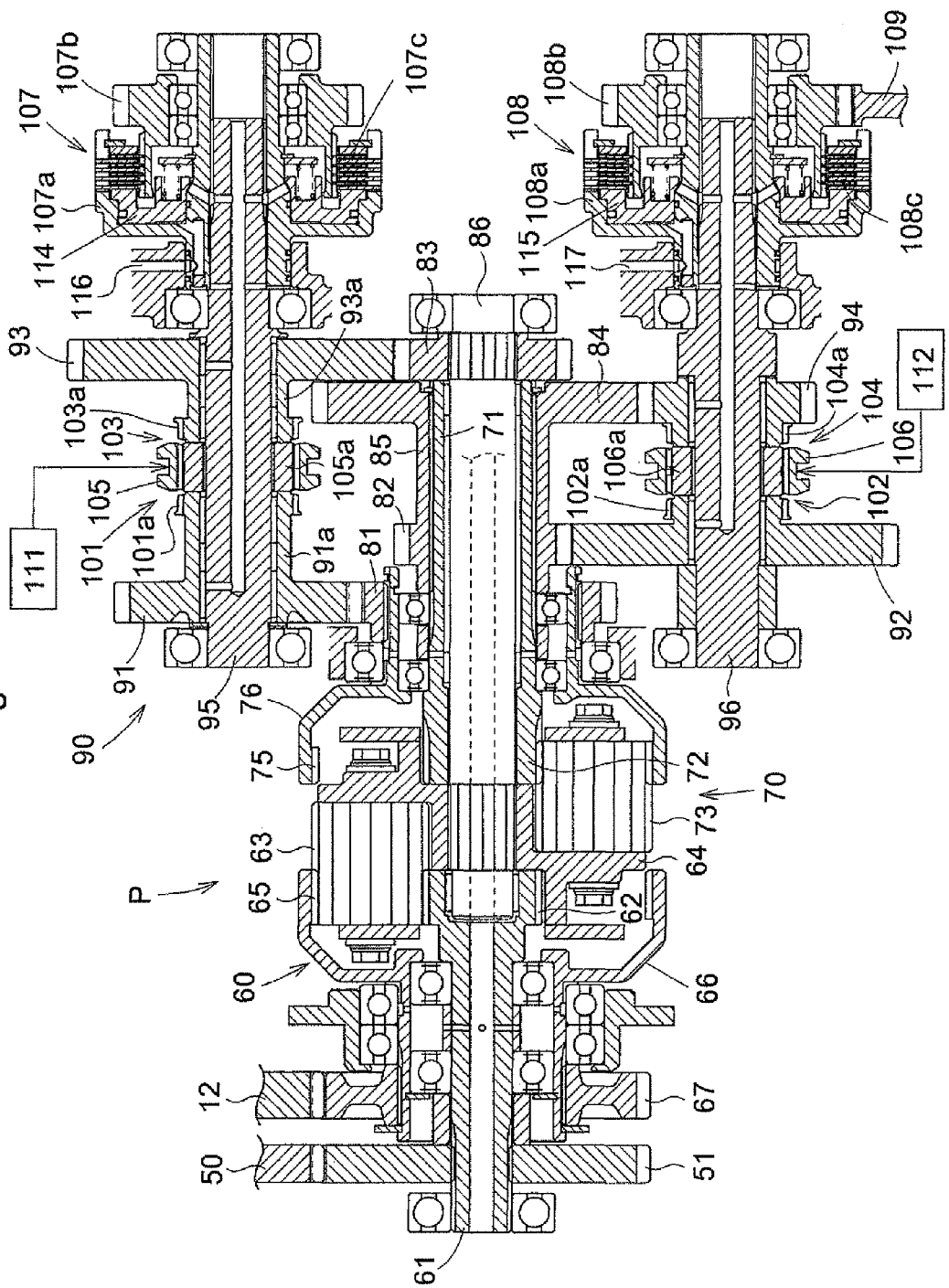
FIG. 2 is a sectional view of a planetary transmission device, a speed range setter, an odd number range transmission clutch and an even number range transmission clutch.

FIG. 2 shows a sectional structure of the planetary transmission device P. As shown in this figure and FIG. 1, the planetary transmission device P includes a planetary transmission mechanism 60 located upstream in the direction of transmission (hereinafter abbreviated as the upstream planetary mechanism 60), and a planetary transmission mechanism 70 located downstream (hereinafter abbreviated as the downstream planetary mechanism), for transmitting the driving forces inputted from the stepless transmission 20 and forward and backward changeover device 10 toward the speed range setter 90.

The upstream planetary mechanism 60 a sun gear 62 provided at one end of the sun gear shaft 61 to be rotatable together, three planet gears 63 located peripherally of the sun gear 62, distributed circumferentially of the sun gear 62 and meshed with the sun gear 62, a carrier 64 for freely rotatably supporting the three planet gears 63, and a ring gear 65 meshed with the three planet gears 63. The sun gear 62 and sun gear shaft 61 are formed integrally.

The downstream planetary mechanism 70 includes a sun gear 72 located downstream, in the direction of transmission, of the sun gear 62 of the upstream planetary mechanism 60 to be rotatable about the same axis as the sun gear 62, three planet gears 73 located peripherally of the sun gear 72, distributed circumferentially of the sun gear 72 and meshed with the sun gear 72, the carrier 64 for freely rotatably supporting the three planet gears 73, and a ring gear 75 meshed with the three planet gears 73.

Figure 3:
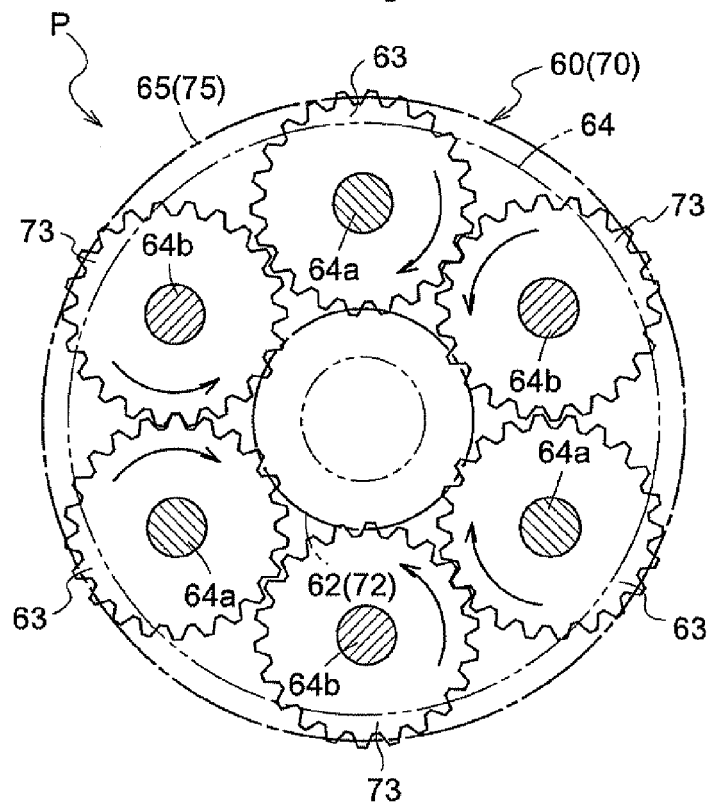
FIG. 3 is an arrangement plan of planet gears.

FIG. 3 is an arrangement plan of planet gears 63 of the upstream planetary mechanism 60 and the planet gears 73 of the downstream planetary mechanism 70. As shown in this figure and FIG. 2, the three planet gears 63 of the upstream planetary mechanism 60 and the three planet gears 73 of the downstream planetary mechanism 70 are arranged such that one planet gear 63 of the upstream planetary mechanism 60 and one planet gear 73 of the downstream planetary mechanism 70 form one gear pair close together circumferentially of the sun gears 62 and 72, that another planet gear 63 of the upstream planetary mechanism 60 and another planet gear 73 of the downstream planetary mechanism 70 form one gear pair close together circumferentially of the sun gears 62 and 72, and that the remaining one planet gear 63 of the upstream planetary mechanism 60 and the remaining one planet gear 73 of the downstream planetary mechanism 70 form one gear pair close together circumferentially of the sun gears 62 and 72. The planet gear 63 of the upstream planetary mechanism 60 and the planet gear 73 of the downstream planetary mechanism 70 in each gear pair are meshed with and interlocked to each other at ends opposite from the ends of the planet gears 63 and 73 meshed with the sun gears 62 and 72.

In two adjacent gear pairs, the tooth tips of the planet gears 63 and 73 of one gear pair are located between the tooth tips of the planet gears 63 and 73 of the other gear pair. However, in two adjacent gear pairs, the planet gears 63 and 73 of one gear pair are not interlocked to the planet gears 63 and 73 of the other gear pair. By employing the arrangement where the tooth tips are located between the tooth tips of the planet gears 63 and 73, the planetary transmission device P can be compact with a small outside diameter, with the sun gears 62 and 72 and ring gears 65 and 75 having reduced diameters, while allowing the planetary transmission device P to have necessary gear ratios.

As shown in FIG. 3, the planet gears 63 of the upstream planetary mechanism 60 are rotatably supported by support shafts 64a of the carrier 64, while the planet gears 73 of the downstream planetary mechanism 70 are rotatably supported by support shafts 64b of the carrier 64. That is, the carrier 64 is common to the upstream planetary mechanism 60 and downstream planetary mechanism 70. Specifically, the carrier 64 supports the planet gears 63 and 73 so that each planet gear 63 of the upstream planetary mechanism 60 revolves around the sun gear 62 while rotating in mesh with the planet gear 73 forming a gear pair therewith of the downstream planetary mechanism 70, and that each planet gear 73 of the downstream planetary mechanism 70 revolves around the sun gear 72 while rotating in mesh with the planet gear 63 forming a gear pair therewith of the upstream planetary mechanism 60.

The ring gear 65 of the upstream planetary mechanism 60 is interlocked to the output gear 12 through an interlocking member 66 continuous from the ring gear 65 to be rotatable together, and through a transmission gear 67 connected by spline engagement to an end of the interlocking member 66 to be rotatable together, and engageable with the output gear 12 of the forward and backward changeover device 10. The ring gear 65 and interlocking member 66 are formed integrally. The sun gear 62 of the upstream planetary mechanism 60 is interlocked to the motor shaft 23 of the stepless transmission 20 through the sun gear shaft 61, gear 51 and gear 50.

The planetary transmission device P includes, besides the first output gear 81, a second output gear 82, a third output gear 83 and a fourth output gear 84 arranged in the fore and aft direction in the transmission case and rearward of the first output gear 81.

The first output gear 81 is interlocked to the ring gear 75 of the downstream planetary mechanism 70 to be rotatable together, through an interlocking member 76 having one end thereof connected by spline engagement to the first output gear 81 to be rotatable together. The interlocking member 76 and ring gear 75 are formed integrally.

A rotary support shaft 85 supporting the second output gear 82 and fourth output gear 84 to be rotatable together, and a sun gear shaft 71 supporting the sun gear 72 of the downstream planetary mechanism 70 to be rotatable together, are connected to be rotatable together by spline engagement. Thus, the second output gear 82 and fourth output gear 84 are rotatable together, and are interlocked to the sun gear 72 of the downstream planetary mechanism 70 to be rotatable together.

The third output gear 83 is connected to be rotatable together by spline engagement to the other end of a rotary shaft 86 having one end thereof connected to the carrier 64 to be rotatable together by spline engagement. Thus, the third output gear 83 is connected to the carrier 64 to be rotatable together through the rotary shaft 86.

That is, in the planetary transmission device P, output from the motor shaft 23 of the stepless transmission 20 having received engine drive is inputted to the sun gear 62 of the upstream planetary mechanism 60 through the gear 50, gear 51 and sun gear shaft 61. The driving force of the output gear 12 of the forward and backward changeover device 10 is inputted as engine drive not undergoing the speed change action of the stepless transmission 20, to the ring gear 65 of the upstream planetary mechanism 60 through the gear 67 and interlocking member 66. The output of the stepless transmission 20 and the engine drive not undergoing the speed change action of the stepless transmission 20 are combined by the upstream planetary mechanism 60 and downstream planetary mechanism 70. The combined driving force is outputted from the first second, third and fourth output gears 81, 82, 83 and 84 to the speed range setter 90.

FIG. 2 shows a sectional structure of the speed range setter 90. As shown in this figure and FIG. 1, the speed range setter 90 includes, besides the first input gear 91, a second input gear 92, a third input gear 93 and a fourth input gear 94 meshed with the second output gear 82, third output gear 83 and fourth output gear 84, respectively, an odd number range transmission shaft 95 (first transmission shaft) as acting a transmission shaft for relatively rotatably supporting the first input gear 91 and third input gear 93, and an even number range transmission shaft 96 (second transmission shaft) acting as a transmission shaft for relatively rotatably supporting the second input gear 92 and fourth input gear 94.

Figure 4:
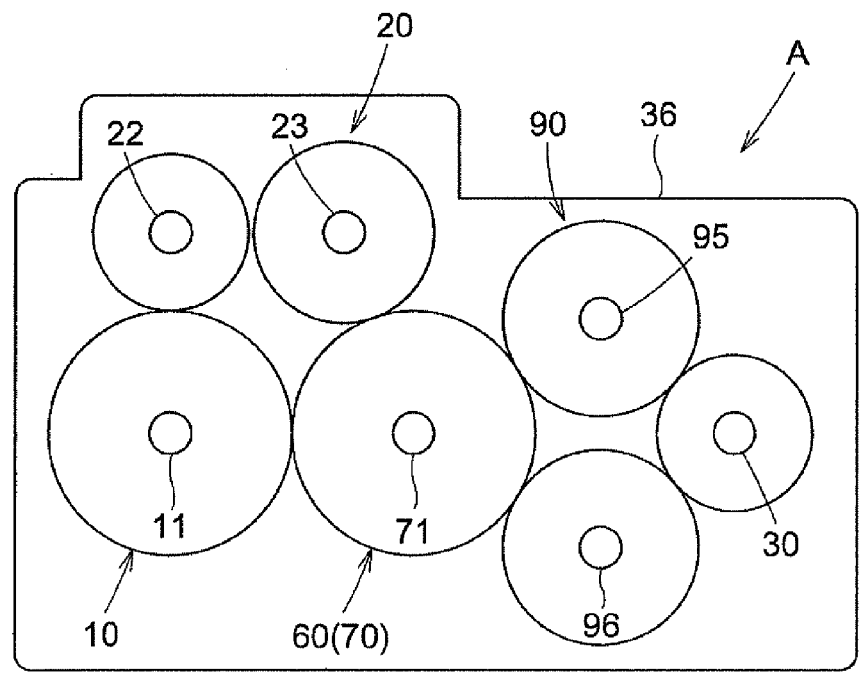
FIG. 4 is an arrangement plan of shafts of the speed change transmission system.

FIG. 4 is an arrangement plan in cross section of the speed change transmission system A. As shown in this figure and FIG. 2, the odd number range transmission shaft 95 and even number range transmission shaft 96 are, throughout their lengths, juxtaposed vertically in the transmission case 36, and arranged parallel to each other. This realizes a reduced size of the speed range setter 90 in the fore and aft direction of the transmission case.

The odd number range transmission shaft 95 has a first clutch 101 mounted on a transmission tube portion 91a of the first input gear 91 and the odd number range transmission shaft 95, a third clutch 103 mounted on a transmission tube portion 93a of the third input gear 93 and the odd number range transmission shaft 95, and an odd number range transmission clutch 107 mounted on an end region remote from the end region on which the first input gear 91 is located of the odd number range transmission shaft 95.

The even number range transmission shaft 96 has a second clutch 102 mounted on one side portion of the second input gear 92 and the even number range transmission shaft 96, a fourth clutch 104 mounted on one side portion of the fourth input gear 94 and the even number range transmission shaft 96, and an even number range transmission clutch 108 mounted on an end region remote from the end region on which the second input gear 92 is located of the even number range transmission shaft 96.

FIG. 2 shows sectional structures of the first clutch 101, second clutch 102, third clutch 103 and fourth clutch 104. As shown in this figure, the first clutch 101, second clutch 102, third clutch 103 and fourth clutch 104 are claw clutches having shift gears 105, 106 supported by the odd number range transmission shaft 95 or even number range transmission shaft 96 to be rotatable therewith and slidable through holders 105a, 106a, and gears 101a, 102a, 103a and 104a formed on the transmission tube portions 91a and 93a or side portions of the corresponding of input gears 91, 92, 93 and 94.

Specifically, the first clutch 101, second clutch 102, third clutch 103 and fourth clutch 104 are engageable when hydraulic pistons 111, 112 interlocked to the shift gears 105, 106 through shifters and provided outside the transmission case 36 are operated to slide the shift gears 105, 106 relative to the holders 105a and 106a and mesh with the holders 105a and 106a and the gears 101a, 102a, 103a and 104a, thereby transmitting the driving force of input gears 91, 92, 93 and 94 to the odd number range transmission shaft 95 and even number range transmission shaft 96 through the shift gears 105, 106 and holders 105a and 106a, and rotating the input gears 91 and 93 with the odd number range transmission shaft 95, or the input gears 92 and 94 with the even number range transmission shaft 96.

The first clutch 101, second clutch 102, third clutch 103 and fourth clutch 104 are disengaged when the shift gears 105, 106 are slid relative to the holders 105a and 106a and separated from the gears 101a, 102a, 103a and 104a, thereby allowing relative rotation between the input gears 91 and 93 and odd number range transmission shaft 95 or the input gears 92 and 94 and even number range transmission shaft 96.

FIG. 2 shows sectional structures of the odd number range transmission clutch 107 and even number range transmission clutch 108. As shown in this figure, the odd number range transmission clutch 107 and even number range transmission clutch 108 are friction clutches having input side rotary members 107a and 108a mounted on the odd number range transmission shaft 95 and even number range transmission shaft 96 to be rotatable together, output gears 107b (fifth output gear) and 108b (sixth output gear) mounted in the odd number range transmission shaft 95 and even number range transmission shaft 96 to be rotatable relative thereto, and friction clutch bodies 107c and 108c of the multi-plate type mounted between sides of the output gears 107b and 108b and the input side rotary members 107a and 108a.

The output gear 107b of the odd number range transmission clutch 107 is interlocked to the output shaft 30 through a transmission gear 109 (fifth input gear) meshed with the output gear 107b and mounted on the output shaft 30 to be rotatable together. The output gear 108b of the even number range transmission clutch 108 is meshed with the transmission gear 109, and interlocked to the output shaft 30 through this transmission gear 109.

Specifically, the odd number range transmission clutch 107 and even number range transmission clutch 108 are engaged when control hydraulic pressure is supplied from control oil lines 116, 117 to hydraulic pistons 114, 115 slidably mounted inside the input side rotary members 107a and 108a, and the hydraulic pistons 114, 115 pressurize the friction clutch bodies 107c and 108c to a state of engagement, whereby the input side rotary members 107a and 108a and output gears 107b and 108b are interlocked to be rotatable together by the friction clutch bodies 107c and 108c. The odd number range transmission clutch 107 and even number range transmission clutch 108 are disengaged when the control hydraulic pressure is discharged from the hydraulic pistons 114, 115, and the pressurization by the hydraulic pistons 114, 115 of the friction clutch bodies 107c and 108c is canceled to place the friction clutch bodies 107c and 108c in an disengaged state, thereby allowing relative rotation of the input side rotary members 107a and 108a and the output gears 107b and 108b.

Thus, the odd number range transmission clutch 107, when engaged, transmits the driving force of the odd number range transmission shaft 95 to the output gear 107b to establish transmission from the odd number range transmission shaft 95 to the output shaft 30, and when disengaged, breaks the transmission from the odd number range transmission shaft 95 to the output shaft 30.

The even number range transmission clutch 108, when engaged, transmits the driving force of the even number range transmission shaft 96 to the output gear 108b to establish transmission from the even number range transmission shaft 96 to the output shaft 30, and when disengaged, breaks the transmission from the even number range transmission shaft 96 to the output shaft 30.

Figures 5, 6:
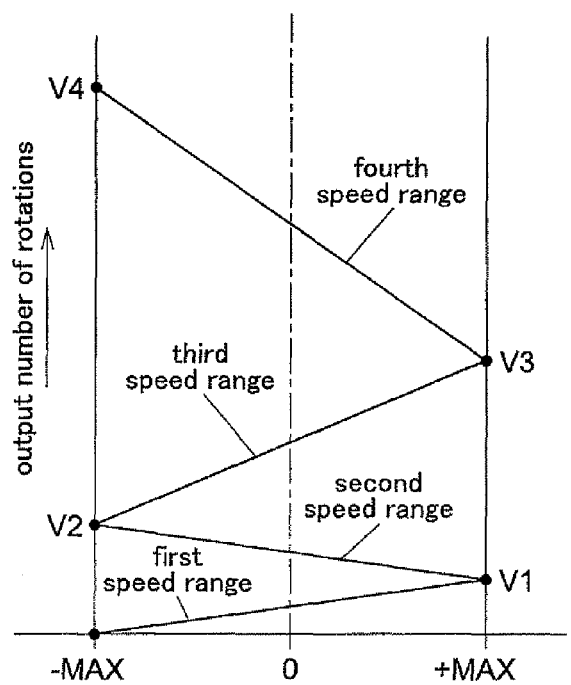
FIG. 5 is an explanatory view of operative states of the speed range setter.
FIG. 6 is an explanatory view showing a relationship between speed change states of a stepless transmission, output speeds of the speed change transmission system, and speed ranges.

FIG. 5 is an explanatory view of operative states of the speed range setter 90. The sign "ON" shown in FIG. 5 indicates engaged states of the first, second, third and fourth clutches 101, 102, 103, 104, odd number range transmission clutch 107 and even number range transmission clutch 108. The sign "−" shown in FIG. 5 indicates disengaged states of the first, second, third and fourth clutches 101, 102, 103, 104, odd number range transmission clutch 107 and even number range transmission clutch 108.

As shown in this figure, the speed range setter 90 sets the speed change transmission system A to a first speed range when the first clutch 101 is engaged and the second, third and fourth clutches 102, 103, 104 are disengaged. Then, the speed change transmission system A changes, through the first output gear 81 and first input gear 91, the speed of a combined driving force outputted by the planetary transmission device P from the first output gear 81, and transmits it to the odd number range transmission shaft 95 through the first clutch 101. At this time, as the odd number range transmission clutch 107 is engaged, the speed change transmission system A transmits the driving force of the odd number range transmission shaft 95 to the output shaft 30 through the odd number range transmission clutch 107 and transmission gear 109.

The speed range setter 90 sets the speed change transmission system A to a second speed range when the second clutch 102 is engaged and the first, third and fourth clutches 101, 103, 104 are disengaged. Then, the speed change transmission system A changes, through the second output gear 82 and second input gear 92, the speed of a combined driving force outputted by the planetary transmission device P from the second output gear 82, and transmits it to the even number range transmission shaft 96 through the second clutch 102. At this time, as the even number range transmission clutch 108 is engaged, the speed change transmission system A transmits the driving force of the even number range transmission shaft 96 to the output shaft 30 through the even number range transmission clutch 108 and transmission gear 109.

The speed range setter 90 sets the speed change transmission system A to a third speed range when the third clutch 103 is engaged and the first, second and fourth clutches 101, 102, 104 are disengaged. Then, the speed change transmission system A changes, through the third output gear 83 and third input gear 93, the speed of a combined driving force outputted by the planetary transmission device P from the third output gear 83, and transmits it to the odd number range transmission shaft 95 through the third clutch 103. At this time, as the odd number range transmission clutch 107 is engaged, the speed change transmission system A transmits the driving force of the odd number range transmission shaft 95 to the output shaft 30 through the odd number range transmission clutch 107 and transmission gear 109.

The speed range setter 90 sets the speed change transmission system A to a fourth speed range when the fourth clutch 104 is engaged and the first, second and third clutches 101, 102, 103 are disengaged. Then, the speed change transmission system A changes, through the fourth output gear 84 and fourth input gear 94, the speed of a combined driving force outputted by the planetary transmission device P from the fourth output gear 84, and transmits it to the even number range transmission shaft 96 through the fourth clutch 104. At this time, as the even number range transmission clutch 108 is engaged, the speed change transmission system A transmits the driving force of the even number range transmission shaft 96 to the output shaft 30 through the even number range transmission clutch 108 and transmission gear 109.

Figure 8:
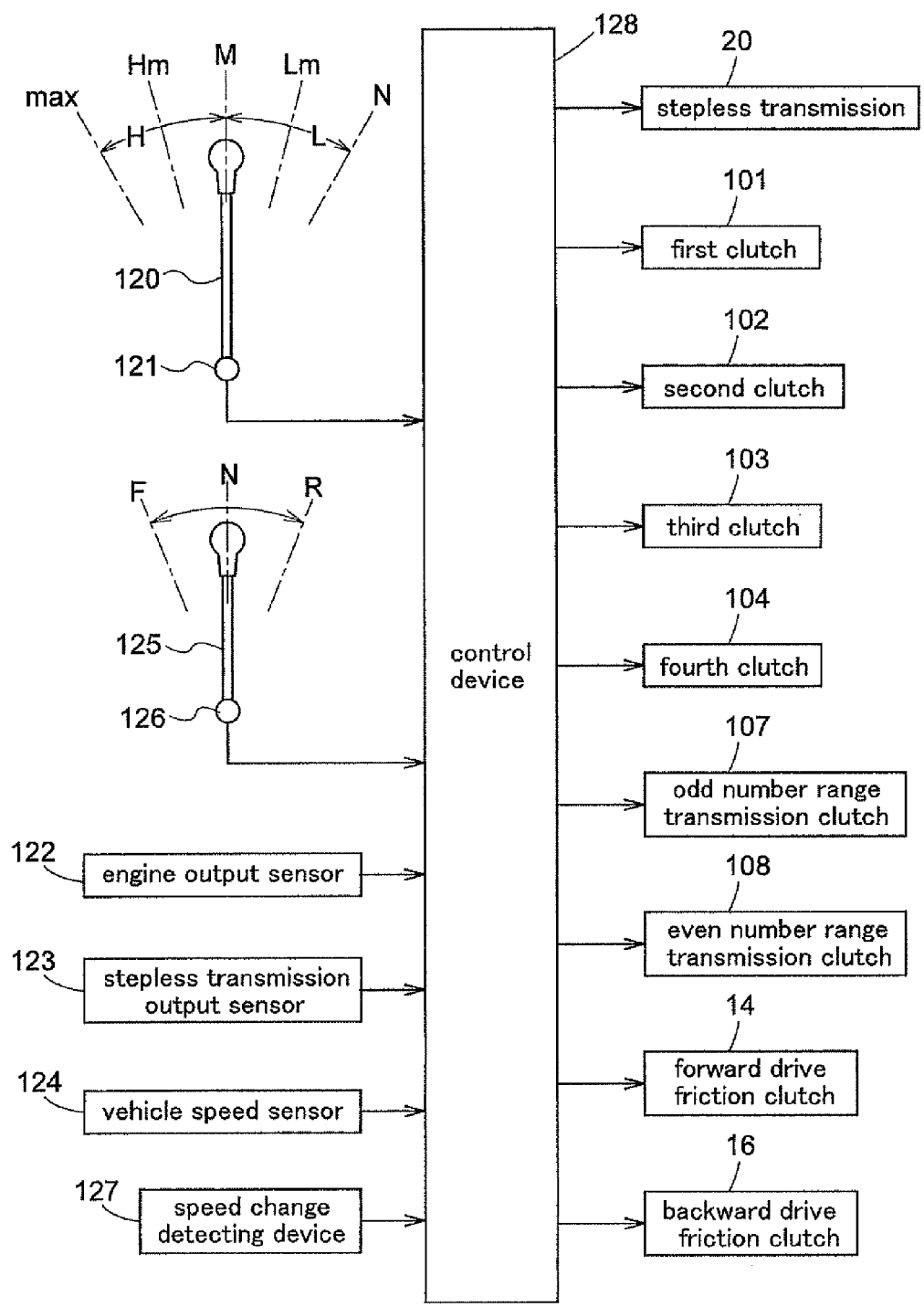
FIG. 8 is a block diagram of an operating system.

FIG. 8 is a block diagram of an operating system provided for the tractor for operating the traveling transmission system. As shown in this figure, this operating system includes a shift lever 120, a shift detecting device 121, an engine output sensor 122, a stepless transmission output sensor 123, a vehicle speed sensor 124, a forward and backward drive lever 125, a forward and backward drive detecting device 126, a speed change detecting device 127, and a control device 128 linked with the detecting devices 121, 126, 127 and sensors 122, 123, 124.

The control device 128 is linked with an operating device (not shown) of an actuator (not shown) for changing the swash plate angle of the hydraulic pump 24 of the stepless transmission 20. The control device 128 is linked with control valves (not shown) for operating the hydraulic pistons 111, 112, 114, 115 of the first clutch 101, second clutch 102, third clutch 103, fourth clutch 104, odd number range transmission clutch 107 and even number range transmission clutch 108. The control device 128 is linked with an actuator (not shown) for switching the forward drive friction clutch 14 and backward drive friction clutch 16.

As shown in FIG. 8, the shift lever 120 is rockable through an operating range from neutral position N to maximum speed position max. The portion of the operating range from neutral position N to a middle position M serves as a low-speed range L. The portion of the operating range from the middle position M to the maximum speed position max serves as a high-speed range H.

The shift detecting device 121 is formed of a rotary potentiometer interlocked to the shift lever 120. This shift detecting device 121 detects an operating position of the shift lever 120, and outputs this detection result to the control device 128.

The engine output sensor 122, stepless transmission output sensor 123 and vehicle speed sensor 124 are formed of rotary sensors. The engine output sensor 122 detects an output speed of the engine 1, and outputs this detection result to the control device 128. The stepless transmission output sensor 123 detects an output speed of the motor shaft 23 of the stepless transmission 20, and outputs this detection result to the control device 128. The vehicle speed sensor 124 detects a rotating speed of the output shaft 30 as vehicle speed, and outputs this detection result to the control device 128. The speed change detecting device 127 detects a speed change state of the stepless transmission 20, and feeds this detection result back to the control device 128.

The forward and backward drive lever 125 is rockable to switch to a neutral position N, a forward position F and a reverse position R. The forward and backward drive detecting device 126 is formed of a rotary potentiometer interlocked to the forward and backward drive lever 125. The forward and backward drive detecting device 126 detects an operating position of the forward and backward drive lever 125, and outputs this detection result to the control device 128.

The control device 128 is constructed using a microcomputer. This control device 128 controls the first, second, third and fourth clutches 101, 102, 103, 104, odd number range transmission clutch 107 and even number range transmission clutch 108, based on detection information by the shift detecting device 121, speed change detecting device 127, engine output sensor 122, stepless transmission output sensor 123 and vehicle speed sensor 124, to place the speed change transmission system A in a speed range as an operating state corresponding to an operating position of the shift lever 120 to drive the output shaft 30 at a rotating speed corresponding to the operating position of the shift lever 120. The control device 128 controls the forward drive friction clutch 14 and backward drive friction clutch 16, based on detection information by forward and backward drive detecting device 126, to place the forward and backward changeover device 10 in an operating state corresponding to the operating position of the forward and backward drive lever 125.

Thus, by operating the shift lever 120 and forward and backward drive lever 125, the tractor is caused to travel at a speed corresponding to an operating position of the shift lever 120 and an output speed of the engine 1 in a forward or backward direction corresponding to an operating position of the forward and backward drive lever 125.

FIG. 6 is an explanatory view showing a relationship between speed change states of the stepless transmission 20, output speeds of the output shaft 30 of the speed change transmission system A, and speed ranges set by the speed range setter 90 of the speed change transmission system A. The vertical axis shown in FIG. 6 represents the number of rotations of the output shaft 30 (hereinafter called output speed). The horizontal axis shown in FIG. 6 represents the speed change states of the stepless transmission 20. The sign "−MAX" on this horizontal axis indicates top speed in a reverse rotational transmission state of the stepless transmission 20. "0" on the horizontal axis indicates neutral state of the stepless transmission 20. The sign "+MAX" on the horizontal axis indicates top speed in a forward rotational transmission state of the stepless transmission 20.

As shown in this figure, FIG. 5 and FIG. 8, when the shift lever 120 is operated from neutral position N to a middle position Lm in the low-speed range L (hereinafter called low-speed middle position Lm), the control device 128 engages the first clutch 101, and disengages the second, third and fourth clutches 102, 103, 104, thereby placing the speed change transmission system A in the first speed range. At this time, the control device 128 engages the odd number range transmission clutch 107, and disengages the even number range transmission clutch 108. As a result, the speed change transmission system A transmits the driving force of the first output gear 81 of the planetary transmission device P to the odd number range transmission shaft 95 through the first input gear 91 and first clutch 101, and transmits the driving force of the odd number range transmission shaft 95 to the output shaft 30 through the odd number range transmission clutch 107 and transmission gear 109. As the shift lever 120 is operated from neutral position N toward low-speed middle position Lm, the control device 128 shifts the stepless transmission 20 from "−MAX" toward "+MAX", thereby steplessly accelerating the output speed from "0". When the shift lever 120 reaches the low-speed middle position Lm, the control device 128 operates the stepless transmission 20 to "+MAX", thereby setting the output speed to "V1."

When the shift lever 120 is operated from the low-speed middle position Lm in the low-speed range L to the middle position M, the control device 128 engages the second clutch 102, and disengages the first, third and fourth clutches 101, 103, 104, thereby placing the speed change transmission system A in the second speed range. At this time, the control device 128 engages the even number range transmission clutch 108, and disengages the odd number range transmission clutch 107. As a result, the speed change transmission system A transmits the driving force of the second output gear 82 of the planetary transmission device P to the even number range transmission shaft 96 through the second input gear 92 and second clutch 102, and transmits the driving force of the even number range transmission shaft 96 to the output shaft 30 through the even number range transmission clutch 108 and transmission gear 109. As the shift lever 120 is operated from the low-speed middle position Lm toward the middle position M, the control device 128 shifts the stepless transmission 20 from "+MAX" toward "−MAX", thereby steplessly accelerating the output speed from "V1". When the shift lever 120 reaches the middle position M, the control device 128 operates the stepless transmission 20 to "−MAX", thereby setting the output speed to "V2."

When the shift lever 120 is operated from neutral position N to a middle position Hm in the high-speed range H (hereinafter called high-speed middle position Hm), the control device 128 engages the third clutch 103, and disengages the first, second and fourth clutches 101, 102, 104, thereby placing the speed change transmission system A in the third speed range. At this time, the control device 128 engages the odd number range transmission clutch 107, and disengages the even number range transmission clutch 108. As a result, the speed change transmission system A transmits the driving force of the third output gear 83 of the planetary transmission device P to the odd number range transmission shaft 95 through the third input gear 93 and third clutch 101, and transmits the driving force of the odd number range transmission shaft 95 to the output shaft 30 through the odd number range transmission clutch 107 and transmission gear 109. As the shift lever 120 is operated from the middle position M toward the high-speed middle position Hm, the control device 128 shifts the stepless transmission 20 from "−MAX" toward "+MAX", thereby steplessly accelerating the output speed from "V2". When the shift lever 120 reaches the high-speed middle position Hm, the control device 128 operates the stepless transmission 20 to "+MAX", thereby setting the output speed to "V3."

When the shift lever 120 is operated from the high-speed middle position Hm in the high-speed range L to the maximum speed position max, the control device 128 engages the fourth clutch 104, and disengages the first, second and third clutches 101, 102, 103, thereby placing the speed change transmission system A in the fourth speed range. At this time, the control device 128 engages the even number range transmission clutch 108, and disengages the odd number range transmission clutch 107. As a result, the speed change transmission system A transmits the driving force of the fourth output gear 84 of the planetary transmission device P to the even number range transmission shaft 96 through the fourth input gear 94 and fourth clutch 104, and transmits the driving force of the even number range transmission shaft 96 to the output shaft 30 through the even number range transmission clutch 108 and transmission gear 109. As the shift lever 120 is operated from the high-speed middle position Hm toward the maximum speed position max, the control device 128 shifts the stepless transmission 20 from "+MAX" toward "−MAX", thereby steplessly accelerating the output speed from "V3". When the shift lever 120 reaches the maximum speed position max, the control device 128 operates the stepless transmission 20 to "−MAX", thereby setting the output speed to "V4."

When the forward and backward drive lever 125 is operated to the forward position F, the control device 128 engages the forward drive friction clutch 14, and disengages the backward drive friction clutch 16, thereby placing the forward and backward changeover device 10 in the forward drive state. Then, the forward and backward changeover device 10 transmits the driving force inputted from the engine 1, as forward driving force, from the output gear 12 to the stepless transmission 20 and planetary transmission device P. The speed change transmission system A transmits the forward driving force to the front wheel differential mechanism 35 and rear wheel differential mechanism 32, whereby the tractor travels forward.

When the forward and backward drive lever 125 is operated to the reverse position R, the control device 128 engages the backward drive friction clutch 16, and disengages the forward drive friction clutch 14, thereby placing the forward and backward changeover device 10 in the backward drive state. Then, the forward and backward changeover device 10 transmits the driving force inputted from the engine 1, as backward driving force, from the output gear 12 to the stepless transmission 20 and planetary transmission device P. The speed change transmission system A transmits the backward driving force to the front wheel differential mechanism 35 and rear wheel differential mechanism 32, whereby the tractor travels backward.

When the forward and backward drive lever 125 is operated to neutral position N, the control device 128 disengages the forward drive friction clutch 14 and backward drive friction clutch 16, thereby placing the forward and backward changeover device 10 in neutral state. Then, the forward and backward changeover device 10 transmits no drive to the stepless transmission 20 or planetary transmission device P. The speed change transmission system A cuts transmission to the front wheel differential mechanism 35 and rear wheel differential mechanism 32, thereby stopping the tractor.

FIG. 7 is an explanatory view showing operating states of the first, second, third and fourth clutches 101, 102, 103, 104 set by the control device 128 at the time of switching the speed ranges of the speed change transmission system A. The sign "inc" shown in FIG. 7 indicates that the output speed of the output shaft 30 increases for switching of the speed ranges. The sign "dec" shown in FIG. 7 indicates that the output speed of the output shaft 30 decreases for switching of the speed ranges.

As shown in this figure, when switching the speed ranges of the speed change transmission system A, the control device 128 operates the clutches 101, 102, 103, 104, 107, 108 to create a double transmission state where both the odd number range transmission shaft 95 and even number range transmission shaft 96 temporarily become a driving state, and power is transmitted from planetary transmission device P to the output shaft 30 through the odd number transmission line having the odd number range transmission shaft 95 and the even number transmission line having the even number range transmission shaft 96.

Specifically, when switching the speed change transmission system A from the first speed range to the second speed range, the control device 128 engages the second clutch 102 before disengaging the first clutch 101, and disengages the first clutch 101 after the second clutch 102 is switched to the engaged state. At this time, the control device 128 engages the even number range transmission clutch 108 before disengaging the odd number range transmission clutch 107, and disengages the odd number range transmission clutch 107 after the even number range transmission clutch 108 is switched to the engaged state.

When switching the speed change transmission system A from the second speed range to the third speed range, the control device 128 engages the third clutch 103 before disengaging the second clutch 102, and disengages the second clutch 102 after the third clutch 103 is switched to the engaged state. At this time, the control device 128 engages the odd number range transmission clutch 107 before disengaging the even number range transmission clutch 108, and disengages the even number range transmission clutch 108 after the odd number range transmission clutch 107 is switched to the engaged state.

When switching the speed change transmission system A from the third speed range to the fourth speed range, the control device 128 engages the fourth clutch 104 before disengaging the third clutch 103, and disengages the third clutch 103 after the fourth clutch 104 is switched to the engaged state. At this time, the control device 128 engages the even number range transmission clutch 108 before disengaging the odd number range transmission clutch 107, and disengages the odd number range transmission clutch 107 after the even number range transmission clutch 108 is switched to the engaged state.

When switching the speed change transmission system A from the fourth speed range to the third speed range, the control device 128 engages the third clutch 103 before disengaging the fourth clutch 104, and disengages the fourth clutch 104 after the third clutch 103 is switched to the engaged state. At this time, the control device 128 engages the odd number range transmission clutch 107 before disengaging the even number range transmission clutch 108, and disengages the even number range transmission clutch 108 after the odd number range transmission clutch 107 is switched to the engaged state.

When switching the speed change transmission system A from the third speed range to the second speed range, the control device 128 engages the second clutch 102 before disengaging the third clutch 103, and disengages the third clutch 103 after the second clutch 102 is switched to the engaged state. At this time, the control device 128 engages the even number range transmission clutch 108 before disengaging the odd number range transmission clutch 107, and disengages the odd number range transmission clutch 107 after the even number range transmission clutch 108 is switched to the engaged state.

When switching the speed change transmission system A from the second speed range to the first speed range, the control device 128 engages the first clutch 101 before disengaging the second clutch 102, and disengages the second clutch 102 after the first clutch 101 is switched to the engaged state. At this time, the control device 128 engages the odd number range transmission clutch 107 before disengaging the even number range transmission clutch 108, and disengages the even number range transmission clutch 108 after the odd number range transmission clutch 107 is switched to the engaged state.

When creating the double transmission state where both the odd number range transmission shaft 95 and even number range transmission shaft 96 are in the driving state, the control device 128 operates the odd number range transmission clutch 107 and even number range transmission clutch 108 to a half-transmission state. That is, even if variations in torque occur in the double transmission state, the stepless transmission 20 absorbs the variation in torque by slipping of its hydraulic oil. In addition, the control device 128 causes the odd number range transmission clutch 107 and even number range transmission clutch 108 to produce slipping for absorbing the variations in torque.

As shown in FIG. 1, the front wheel change speed device 40 includes, besides the input shaft 41 and output shaft 42, a standard gear transmission mechanism 45 with a standard transmission clutch 44, and an accelerating gear transmission mechanism 47 with an accelerating transmission clutch 46, which are arranged on the input shaft 41 and output shaft 42.

When the standard transmission clutch 44 is engaged and the accelerating transmission clutch 46 is disengaged, the front wheel change speed device 40 assumes a standard transmission state for transmitting the driving force of the input shaft 41 to the output shaft 42 through the standard gear transmission mechanism 45. Then, the front wheel change speed device 40 drives the right and left front wheels such that an average peripheral velocity of the right and left front wheels and an average peripheral velocity of the right and left rear wheels are the same.

When the standard transmission clutch 44 is disengaged and the accelerating transmission clutch 46 is engaged, the front wheel change speed device 40 assumes a standard transmission state for transmitting the driving force of the input shaft 41 to the output shaft 42 through the accelerating gear transmission mechanism 47. Then, the front wheel change speed device 40 drives the right and left front wheels such that an average peripheral velocity of the right and left front wheels is approximately twice as fast as an average peripheral velocity of the right and left rear wheels.

Figure 9:
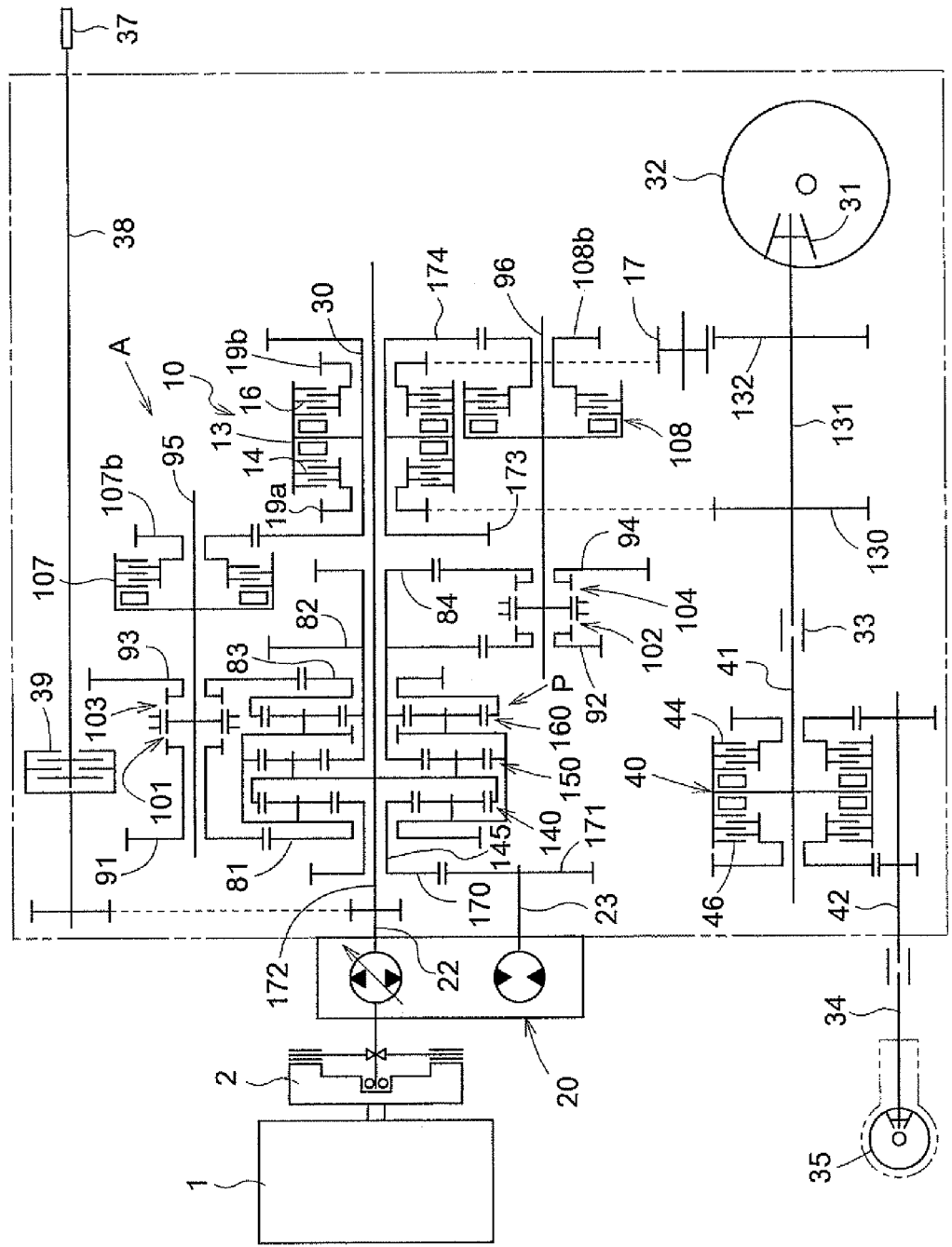
FIG. 9 is a line map of a traveling transmission system of a tractor equipped with a speed change transmission system in a second embodiment.

FIG. 9 is a line map of a traveling transmission system of a tractor equipped with a speed change transmission system A in a second embodiment of this invention.

In the traveling transmission system of the tractor equipped with the speed change transmission system A in the second embodiment of this invention, output from output shaft 30 acting as output rotary member of the speed change transmission system A to a rear wheel differential mechanism 32 and a front wheel change speed device 40 through a forward and backward changeover device 10.

Figure 10:
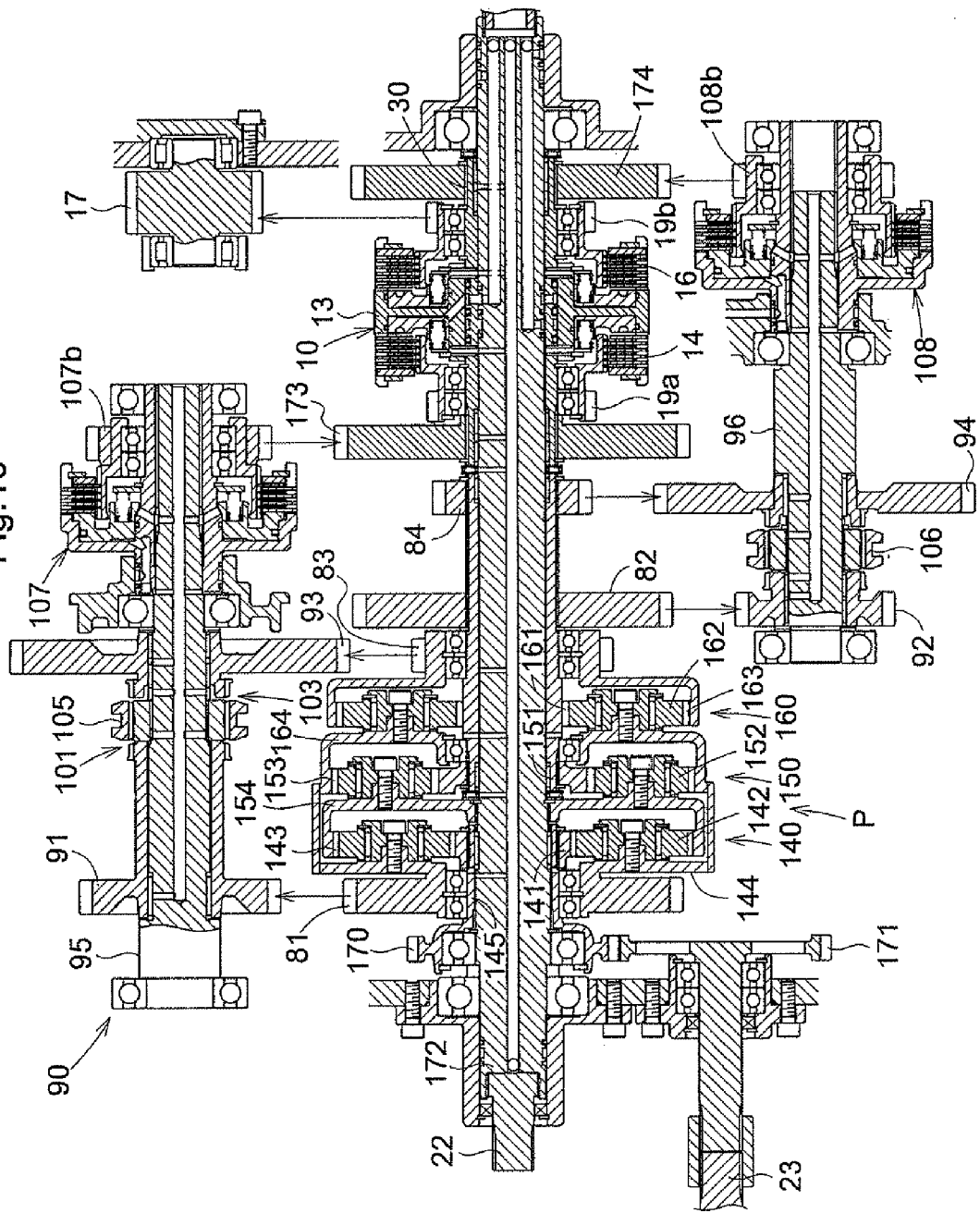
FIG. 10 is a sectional view of a planetary transmission device and a speed range setter of the speed change transmission system in the second embodiment.
Figure 11:
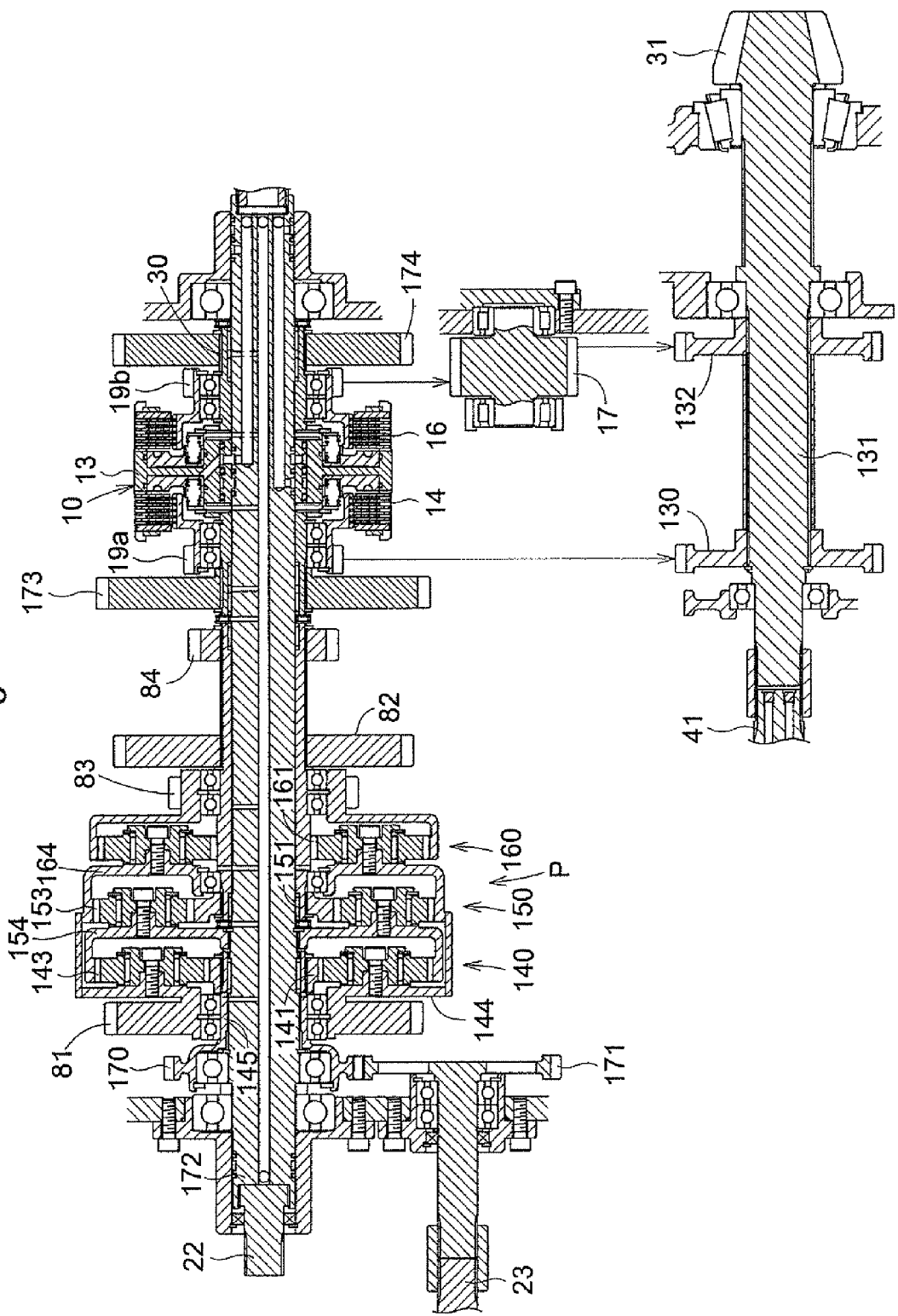
FIG. 11 is a sectional view of a forward and backward changeover device of the traveling transmission system equipped with the speed change transmission system in the second embodiment.

As shown in FIGS. 9, 10 and 11, the forward and backward changeover device 10 includes an input side rotary member 13 mounted on the output shaft 30 to be rotatable together, output gears 19*a* and 19*b* located at the front and rear of this input side rotary member 13, a forward drive friction clutch 14 mounted between one end of the input side rotary member 13 and the front output gear 19*a*, a backward drive friction clutch 16 mounted between the other end of the input side rotary member 13 and the rear output gear 19*b*, and a reversing gear 17 meshed with the rear output gear 19*b*

The front output gear 19*a* is interlocked to an input gear 31 of the rear wheel differential mechanism 32 an input shaft 41 of the front wheel change speed device 40 through a transmission gear 130 and a transmission shaft 131. The reversing gear 17 is interlocked to the input gear 31 of the rear wheel differential mechanism 32 and the input shaft 41 of the front wheel change speed device 40 through a transmission gear 132 and the transmission shaft 131.

When the speed change transmission system A in the second embodiment and the speed change transmission system A in the first embodiment are compared, the same construction is provided in which the planetary transmission device P combines the output of the stepless transmission 20 to which engine drive is inputted, and the engine drive force not undergoing the speed change action by the stepless transmission 20, and the combined driving force from the planetary transmission device P is converted into the four stage speed ranges by switching of the first, second, third and fourth clutches 101, 102, 103, 104, which are transmitted by the two transmission shafts, i.e. the odd number range transmission shaft 95 and even number range transmission shaft 96, to the output shaft 30 acting as the output rotary member. Different constructions are provided in respect of the planetary transmission device P. This difference will be described.

As shown in FIGS. 9 and 10, the planetary transmission device P of the speed change transmission system A in the second embodiment includes a first planetary transmission mechanism 140, a second planetary transmission mechanism 150 and a third planetary transmission mechanism 160.

As shown in FIG. 10, the first planetary transmission mechanism 140, second planetary transmission mechanism 150 and third planetary transmission mechanism 160 have one sun gear 141, 151, 161, a plurality of planet gears 142, 152, 162, a ring gear 143, 153, 163 and a carrier 144, 154, 164.

The sun gear 141 of the first planetary transmission mechanism 140 is interlocked to a motor shaft 23 of the stepless transmission 20 through a sun gear shaft 145, a gear 170 and a gear 171. The carrier 144 of the first planetary transmission mechanism 140, the ring gear 153 of the second planetary transmission mechanism 150 and the carrier 164 of the third planetary transmission mechanism 160 are interlocked to be rotatable together. The ring gear 143 of the first planetary transmission mechanism 140 and the carrier 154 of the second planetary transmission mechanism 150 are interlocked to be rotatable together, and are interlocked to a pump shaft 22 of the stepless transmission 20 to be rotatable together through an interlocking shaft 172. The sun gear 151 of the second planetary transmission mechanism 150 and the sun gear 161 of the third planetary transmission mechanism 160 are interlocked to be rotatable together.

The planetary transmission device P has a first output gear 81 interlocked to the carrier 144 of the first planetary transmission mechanism 140 to be rotatable together, has a second output gear 82 and a fourth output gear 84 interlocked to the sun gears 151, 161 of the second and third planetary transmission mechanisms 150, 160 to be rotatable together, and has a third output gear 83 interlocked to the ring gear 163 of the third planetary transmission mechanism 160 to be rotatable together.

The planetary transmission device P inputs output from the motor shaft 23 of the stepless transmission 20 to the sun gear 141 of the first planetary transmission mechanism 140, inputs the driving force of the pump shaft 22 of the stepless transmission 20 as engine drive not undergoing the speed change action by the stepless transmission 20 to the ring gear 143 of the first planetary transmission mechanism 140 and the carrier 154 of the second planetary transmission mechanism 150, and combines the inputted driving force of the stepless transmission 20 and driving force of the engine 1 through the first planet gear mechanism 140, second planetary transmission mechanism 150 and third planetary transmission mechanism 160. The combined driving force is transmitted from the first output gear 81 to the first input gear 91 of the odd number range transmission shaft 95, transmitted from the second output gear 82 to the second input gear 92 of the even number range transmission shaft 96, transmitted from the third output gear 83 to the third input gear 93 of the odd number range transmission shaft 95, and transmitted from the fourth output gear 84 to the fourth input gear 94 of the even number range transmission shaft 96.

The first output gear 81 and first input gear 91 are interlocked in a transmission ratio in which the number of rotations of the first input gear 91 is twice the number of rotations of the first output gear 81. The second output gear 82 and second input gear 92 are interlocked in a transmission ratio in which the number of rotations of the second input gear 92 is twice the number of rotations of the second output gear 82. The third output gear 83 and third input gear 93 are interlocked in a transmission ratio in which the number of rotations of the third input gear 93 is one half of the number of rotations of the third output gear 83. The fourth output gear 84 and fourth input gear 94 are interlocked in a transmission ratio in which the number of rotations of the fourth input gear 94 is one half of the number of rotations of the fourth output gear 84. An output gear 107b of the odd number range transmission clutch 107 and a driven gear 173 of the output shaft 30 are interlocked in a transmission ratio in which the number of rotations of the output shaft 30 is one half of the number of rotations of the output gear 107b. An output gear 108b of the even number range transmission clutch 108 and a driven gear 174 of the output shaft 30 are interlocked in a transmission ratio in which the number of rotations of the output shaft 30 is one half of the number of rotations of the output gear 108b.

Thus, in transmitting the driving force of the third output gear 83 to the output shaft 30 with deceleration to one fourth of the number of rotations, deceleration is made in two places, i.e. between the third output gear 83 and odd number range transmission shaft 95 and between the output gear 107b and output shaft 30. In transmitting the driving force of the fourth output gear 84 to the output shaft 30 with deceleration to one fourth of the number of rotations, deceleration is made in two places, i.e. between the fourth output gear 84 and even number range transmission shaft 96 and between the output gear 108b and output shaft 30. Then, one fourth deceleration can be achieved while maintaining the size of the speed range setter 90 small.

Figure 12:
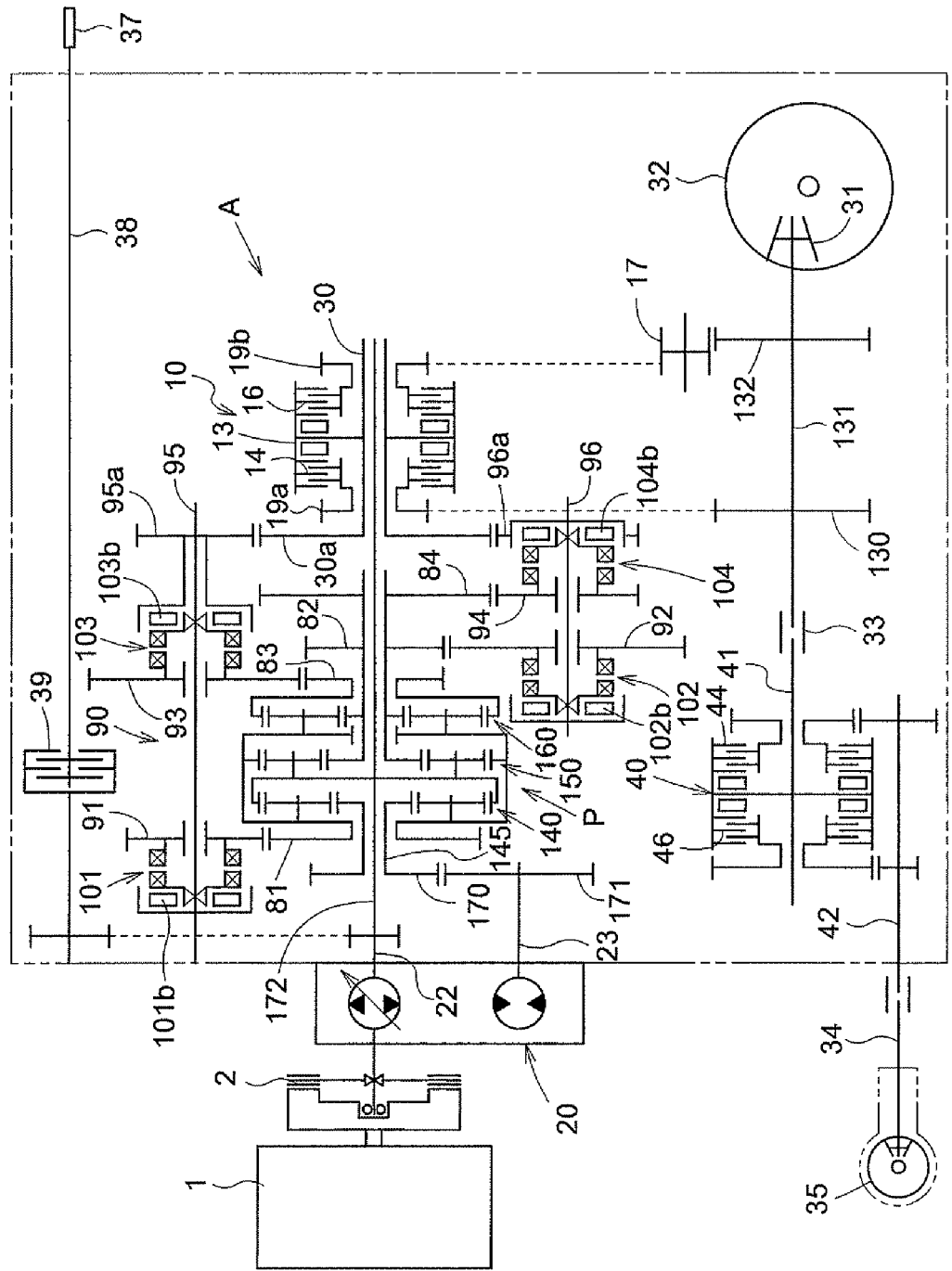
FIG. 12 is a line map of a traveling transmission system of a tractor equipped with a speed change transmission system in a third embodiment.

FIG. 12 is a line map of a traveling transmission system of a tractor equipped with a speed change transmission system A in a third embodiment of this invention.

In the traveling transmission system of the tractor equipped with the speed change transmission system A in the third embodiment of this invention, output from output shaft 30 acting as output rotary member of the speed change transmission system A to a rear wheel differential mechanism 32 and a front wheel change speed device 40 through a forward and backward changeover device 10.

Figure 13:
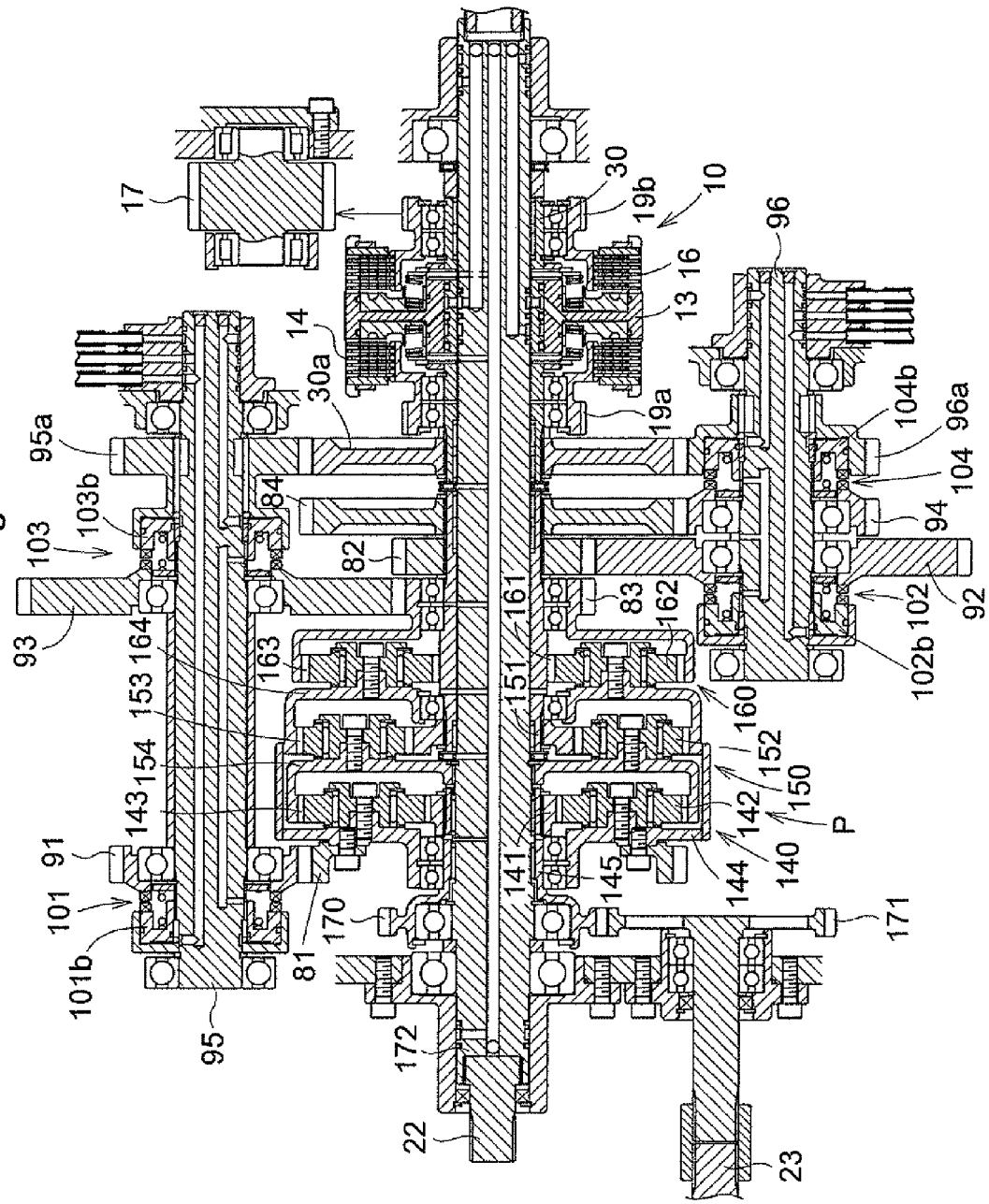
FIG. 13 is a sectional view of a planetary transmission device and a speed range setter of the speed change transmission system in the third embodiment.
Figure 14:
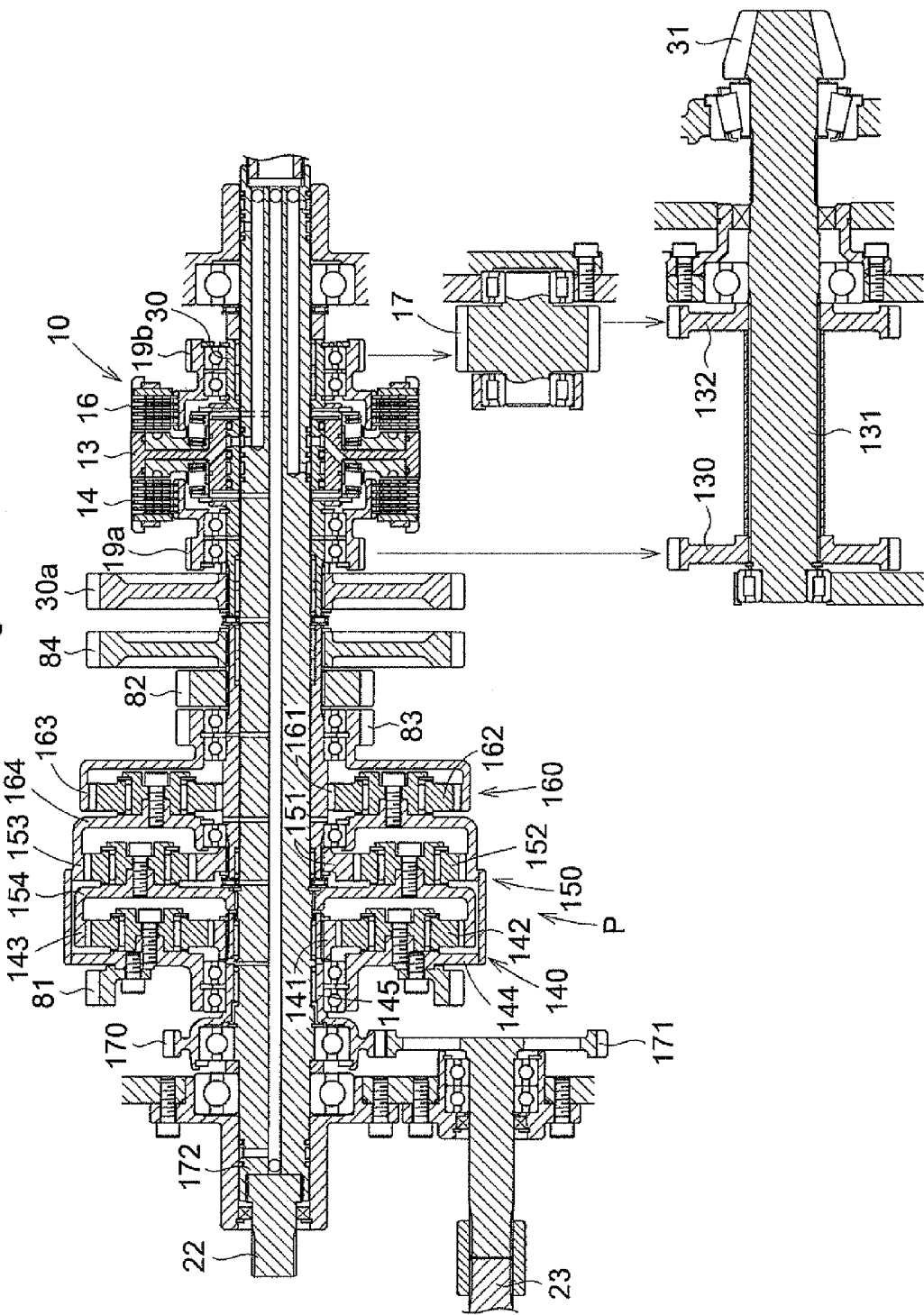
FIG. 14 is a sectional view of a forward and backward changeover device of the traveling transmission system equipped with the speed change transmission system in the third embodiment.

As shown in FIGS. 12, 13 and 14, the forward and backward changeover device 10 in the traveling transmission system equipped with the speed change transmission system A in the third embodiment has the same construction as the forward and backward changeover device 10 in the traveling transmission system equipped with the speed change transmission system A in the second embodiment.

When the speed change transmission system A in the third embodiment and the speed change transmission system A in the first embodiment are compared, the same construction is provided in which the planetary transmission device P combines the output of the stepless transmission 20 to which engine drive is inputted, and the engine drive force not undergoing the speed change action by the stepless transmission 20, and the combined driving force from the planetary transmission device P is converted into the four-stage speed ranges by switching of the first, second, third and fourth clutches 101, 102, 103, 104, which are transmitted by the two transmission shafts, i.e. the odd number range transmission shaft 95 and even number range transmission shaft 96, to the output shaft 30 acting as the output rotary member. Different constructions are provided in respect of the planetary transmission device P and speed range setter 90.

As shown in FIGS. 12 and 13, the planetary transmission device P of the speed change transmission system A in the third embodiment has the same construction as the planetary transmission device P of the speed change transmission system A in the second embodiment.

As shown in FIGS. 12 and 13, the speed range setter 90 of the speed change transmission system A in the third embodiment, and the speed range setter 90 of the speed change transmission system A in the first embodiment, are the same in that the odd number range transmission shaft 95 and even number range transmission shaft 96 are arranged in juxtaposition and in parallel.

The speed range setter 90 of the speed change transmission system A in the third embodiment, and the speed range setter 90 of the speed change transmission system A in the first embodiment, are the same in construction in that the odd number range transmission shaft 95 has, freely rotatably mounted thereon, a first input gear 91 meshed with the first output gear 81 of the planetary transmission device P and a third input gear 93 meshed with the third output gear 83 of the planetary transmission device P, that the even number range transmission shaft 96, has, freely rotatably mounted thereon, a third input gear 93 meshed with the second output gear 83 of the planetary transmission device P and a fourth input gear 94 meshed with the fourth output gear 84 of the planetary transmission device P, that the first clutch 101 transmits the driving force of the first input gear 91 to the odd number range transmission shaft 95, that the second clutch 102 transmits the driving force of the second input gear 92 to the even number range transmission shaft 96, that the third clutch 103 transmits the driving force of the third input gear 93 to the odd number range transmission shaft 95, and that the fourth clutch 104 transmits the driving force of the fourth input gear 94 to the even number range transmission shaft 96.

The speed range setter 90 of the speed change transmission system A in the third embodiment transmits the driving force of the odd number range transmission shaft 95 to the output shaft 30 through an output gear 95a mounted on a rear end portion of the odd number range transmission shaft 95 to be rotatable together, and an input gear 30a mounted on a forward end region of the output shaft 30 to be rotatable together and meshed with the output gear 95a. The driving force of the even number range transmission shaft 96 is transmitted to the output shaft 30 through an output gear 96a mounted on a rear end region of the even number range transmission shaft 96 to be rotatable together, and the input gear 30a meshed with this output gear 96a.

The output gear 95a of the odd number range transmission shaft 95 and the output gear 96a of the even number range transmission shaft 96 are meshed with the same input gear 30a for transmission to the output shaft 30. This transmission structure allows the size in the fore and aft direction of the speed range setter 90 to be small.

In the speed range setter 90 of the speed change transmission system A in the third embodiment, the first clutch 101, second clutch 102, third clutch 103 and fourth clutch 104 are claw clutches with hydraulic pistons 101b, 102b, 103b and 104b rotatable with and slidable relative to the odd number range transmission shaft 95 or even number range transmission shaft 96.

That is, the hydraulic pistons 101b, 102b, 103b and 104b are interlocked by engagement of opposite clutch projections.

When both the clutch of the odd number range transmission shaft 95 (first clutch 101 or third clutch 103) and the clutch of the even number range transmission shaft 96 (second clutch 102 or fourth clutch 104) are engaged to provide a double transmission state, the speed range setter 90 in the third embodiment absorbs torque variations in the double transmission state. Thus, the speed range setter 90 in the third embodiment dispenses with the odd number range transmission clutch 107 and even number range transmission clutch 108 employed in the speed range setter 90 of the first embodiment and second embodiment, thereby achieving an increase in transmission efficiency and compactness of the speed range setter 90.

Figure 15:
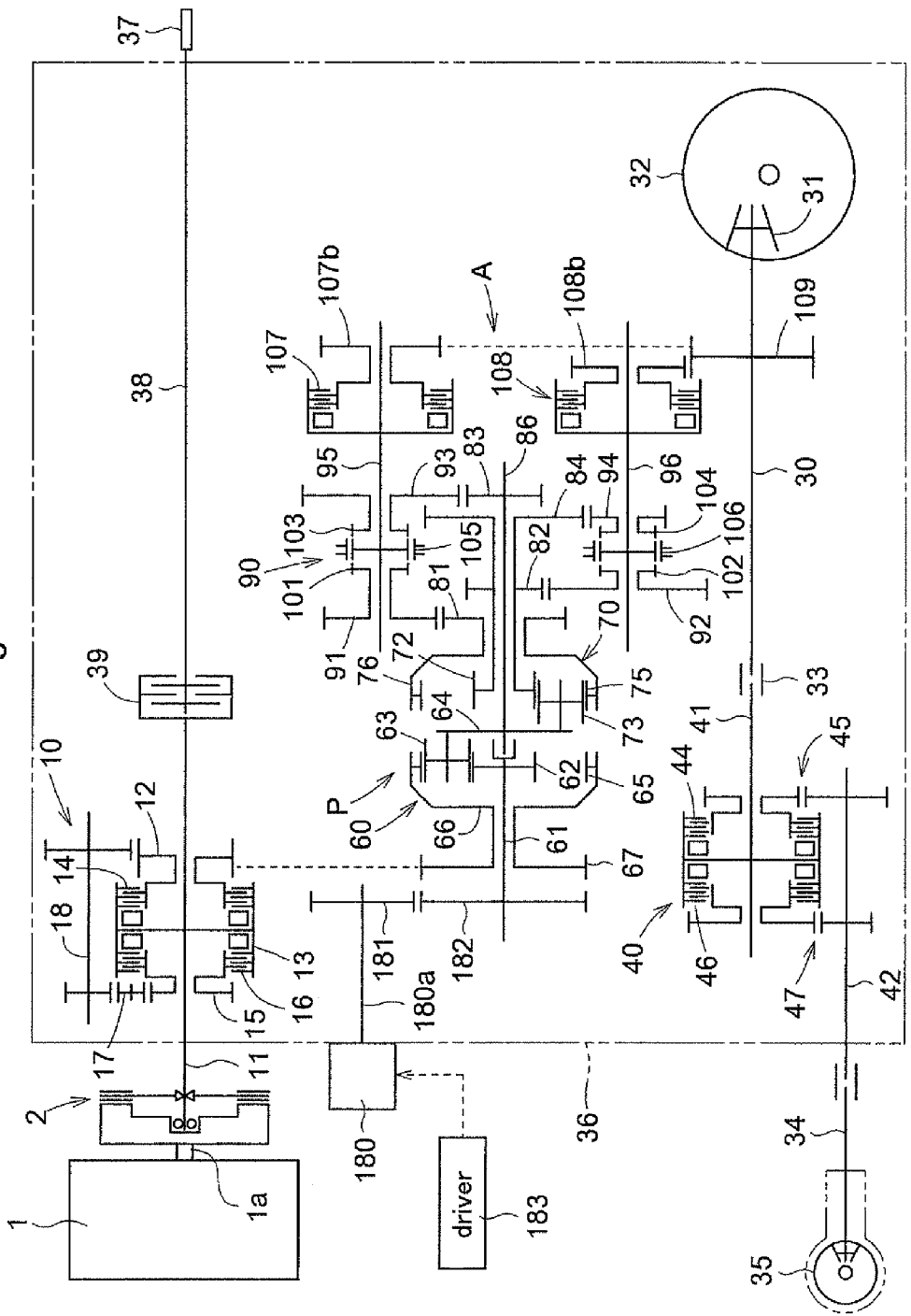
FIG. 15 is a line map of a traveling transmission system of a tractor equipped with a speed change transmission system in a fourth embodiment.

FIG. 15 is a line map of a traveling transmission system of a tractor equipped with a speed change transmission system A in a fourth embodiment of this invention. When the speed change transmission system A in the fourth embodiment and the speed change transmission system A in the first embodiment are compared, the same construction is provided in respect of the planetary transmission device P and speed range setter 90. The speed change transmission system A in the fourth embodiment and the speed change transmission system A in the first embodiment are different in the construction for inputting a driving force for stepless speed changing. This difference will be described next.

The speed change transmission system A in the fourth embodiment has an electric motor 180. The planetary transmission device P inputs output from an output shaft 180a of the electric motor 180 to the sun gear 62 of the upstream planetary mechanism 60 through a transmission gear 181, a transmission gear 182 and a sun gear shaft 61. The planetary transmission device P inputs output from an output shaft 1a of engine 1 to the ring gear 65 of the upstream planetary mechanism 60 through the main clutch 2, forward and backward changeover device 10 and gear 67. The planetary transmission device P receives and combines the driving force of engine 1 and the driving force of electric motor 180, transmits this combined driving force from the first output gear 81 and third output gear 83 to the odd number range transmission shaft 95 of the speed range setter 90, and transmits from the second output gear 82 and fourth output gear 84 to the even number range transmission shaft 96 of the speed range setter 90.

The electric motor 180 changes the number of drive rotations steplessly in response to a shifting operation by a driver 183. With this speed change operation of the electric motor 180, the first, second, third and fourth clutches 101, 102, 103, 104, odd number range transmission clutch 107 and even number range transmission clutch 108 are switched to drive the output shaft 30 as divided into the four stages of the first speed range to the fourth speed range, and subjected to stepless speed changing in each speed range, as in the speed change transmission system A in the first embodiment Other Embodiment Each embodiment described above may be modified such that the odd number range transmission shaft 95 is divided into a transmission shaft having the first clutch 101 and interlocked to the output shaft 30, and a transmission shaft having the third clutch 103 and interlocked to the output shaft 30, that the even number range transmission shaft 96 is divided into a transmission shaft having the second clutch 102 and interlocked to the output shaft 30, and a transmission shaft having the fourth clutch 104 and interlocked to the output shaft 30, and that the transmission shafts are juxtaposed and arranged in parallel. A construction may be employed which includes one transmission shaft with the first clutch 101 and second clutch 102, and one transmission shaft with the third clutch 103 and fourth clutch 104, the two transmission shafts being juxtaposed and arranged in parallel. Either case can fulfill the object of this invention.

INDUSTRIAL UTILITY

The speed change power transmission system according to this invention can be used as a speed change transmission system included in a drive system of a working vehicle such as a tractor.

The invention claimed is:
1. A speed change transmission system having:
a hydrostatic stepless speed change device for receiving engine drive; and
a planetary transmission device having a plurality of planetary transmission mechanisms for combining output of the hydrostatic stepless speed change device and the engine drive not undergoing a speed change action by the hydrostatic stepless speed change device;
a combined driving force from the planetary transmission device being stage-divided into a plurality of speed ranges, and subjected to stepless speed changing at each speed range for output from an output rotary member;
the speed change transmission system comprising:
a first output gear interlocked to the planetary transmission device;
a first input gear meshed with the first output gear;
a first transmission shaft for supporting the first input gear;
a first speed range setting clutch corresponding to the first transmission shaft, and having a first state for fixing the first input gear to the first transmission shaft, and a second state for allowing rotation of the first input gear relative to the first transmission shaft;
a second output gear interlocked to the planetary transmission device;
a second input gear meshed with the second output gear;
a second transmission shaft for supporting the second input gear; and
a second speed range setting clutch corresponding to the second transmission shaft, and having a first state for fixing the second input gear to the second transmission shaft, and a second state for allowing rotation of the second input gear relative to the second transmission shaft;
wherein the first and second transmission shafts are arranged in parallel for selectively transmitting drive to the output rotary member,
wherein the speed change transmission system comprises at least three transmission shafts including the first and second transmission shafts, having corresponding gear pairs and corresponding speed range setting clutches, and interlockable to the planetary transmission device through the gear pairs and the speed range setting clutches, and wherein the at least three transmission shafts are arranged in parallel for selectively transmitting drive to the output rotary member.

2. The speed change transmission system according to claim 1, further comprising:
a third output gear interlocked the planetary transmission device;
a third input gear supported on the first transmission shaft and meshed with the third output gear;
a fourth output gear interlocked to the planetary transmission device;
a fourth input gear supported on the second transmission shaft and meshed with the fourth output gear;
wherein the first speed range setting clutch has a third state for fixing the third input gear to the first transmission shaft, and a fourth state for allowing rotation of the third input gear relative to the first transmission shaft; and
the second speed range setting clutch has a third state for fixing the fourth input gear to the second transmission shaft, and a fourth state for allowing rotation of the fourth input gear relative to the second transmission shaft.

3. The speed change transmission system according to claim 1, wherein:
the planetary transmission device includes a pair of planetary transmission mechanisms having planet gears meshed with each other.

4. The speed change transmission system according to claim 1, wherein each of the first and second speed range setting clutches is a claw clutch.

5. The speed change transmission system according to claim 4, wherein each of the claw clutches is hydraulically operable.

6. The speed change transmission system according to claim 1, wherein each of the first transmission shaft and the second transmission shaft has a friction clutch mounted thereon, thereby allowing a selective transmission of drive from one of the first transmission shaft and the second transmission shaft to the output rotary member.

7. A speed change transmission system having:
a hydrostatic stepless transmission for receiving engine drive; and
a planetary transmission device having a plurality of planetary transmission mechanisms for combining output of the hydrostatic stepless transmission and the engine drive not undergoing a speed change action by the hydrostatic stepless transmission;
a combined driving force from the planetary transmission device being stage-divided into a plurality of speed ranges, and subjected to stepless speed changing at each speed range for output from an output rotary member;
the speed change transmission system comprising:
a first output gear interlocked to the planetary transmission device;
a first input gear meshed with the first output gear;
a first transmission shaft for supporting the first input gear;
a first speed range setting clutch corresponding to the first transmission shaft, and having a first state for fixing the first input gear to the first transmission shaft, and a second state for allowing rotation of the first input gear relative to the first transmission shaft;
a second output gear interlocked to the planetary transmission device;
a second input gear meshed with the second output gear;
a second transmission shaft for supporting the second input gear; and
a second speed range setting clutch corresponding to the second transmission shaft, and having a first state for fixing the second input gear to the second transmission shaft, and a second state for allowing rotation of the second input gear relative to the second transmission shaft;
wherein the first output gear and the first input gear have a gear ratio for forming a first speed range; and
the second output gear and the second input gear have a gear ratio for forming a second speed range continuous with the first speed range and faster than the first speed range,
wherein the speed change transmission system comprises at least three transmission shafts including the first and second transmission shafts, having corresponding gear pairs and corresponding speed range setting clutches, and interlockable to the planetary transmission device, and
wherein the at least three transmission shafts are arranged in parallel for selectively transmitting drive to the output rotary member.

8. The speed change transmission system according to claim 7, further comprising:
a third output gear interlocked to the planetary transmission device;
a third input gear supported on the first transmission shaft and meshed with the third output gear;
a fourth output gear interlocked to the planetary transmission device;
a fourth input gear supported on the second transmission shaft and meshed with the fourth output gear;
wherein the first speed range setting clutch has a third state for fixing the third input gear to the first transmission shaft, and a fourth state for allowing rotation of the third input gear relative to the first transmission shaft;
the second speed range setting clutch has a third state for fixing the fourth input gear to the second transmission shaft, and a fourth state for allowing rotation of the fourth input gear relative to the second transmission shaft;
the third output gear and the third input gear have a gear ratio for forming a third speed range continuous with the second speed range and faster than the second speed range; and
the fourth output gear and the fourth input gear have a gear ratio for forming a fourth speed range continuous with the third speed range and faster than the third speed range.

9. The speed change transmission system according to claim 7, further comprising:
a shift detecting device for detecting a shift position of the hydrostatic stepless transmission; and
a control device for switching each of the speed range setting clutches based on detection information by the shift detecting device, such that, in response to the shift position of the hydrostatic stepless transmission, the combined driving force from the planetary transmission device is stage-divided into the plurality of speed ranges, and subjected to stepless speed changing at each speed range for output from the output rotary member;
wherein the control device is constructed to switch the first and second speed range setting clutches such that a speed range switching operation goes through a switching stage where the first speed range setting clutch mounted on the first transmission shaft and the second speed range setting clutch mounted on the second transmission shaft are both engaged.

10. The speed change transmission system according to claim 8, wherein:
the first transmission shaft has a fifth output gear;
the second transmission shaft has a sixth output gear;
the output rotary member has a fifth input gear meshed with the fifth ou ut gear and the sixth output gear;
the number of rotations is reduced between the third output gear and the third input gear and between the fifth output gear and the said fifth input gear; and
gear ratios of the respective gears are set such that the number of rotations is reduced between the fourth output gear and the fourth input gear, and in a gear ratio of the sixth output gear and the fifth input gear.

11. The speed change transmission system according to claim 10, wherein the gear ratios are set to:
increase the number of rotations between the first output gear and the first input gear; and
increase the number of rotations between the second output gear and the second input gear.

12. The speed change transmission system according to claim 7, wherein:
the planetary transmission device includes a pair of planetary transmission mechanisms having planet gears meshed with each other.

13. The speed change transmission system according to claim 7, wherein each of the first and second speed range setting clutches is a claw clutch.

14. The speed change transmission system according to claim 13, wherein each of the claw clutches is hydraulically operable.

15. The speed change transmission system according to claim 7, wherein each of the first transmission shaft and the second transmission shaft has a friction clutch mounted thereon, thereby allowing a selective transmission of drive from one of the first transmission shaft and the second transmission shaft to the output rotary member.

16. A speed change transmission system having:
a hydrostatic stepless speed change device for receiving engine drive; and
a planetary transmission device having a plurality of planetary transmission mechanisms for combining output of the hydrostatic stepless speed change device and the engine drive not undergoing a speed change action by the hydrostatic stepless speed change device;
a combined driving force from the planetary transmission device being stage-divided into a plurality of speed ranges, and subjected to stepless speed changing at each speed range for output from an output rotary member;
the speed change transmission system comprising:
a first output gear interlocked to the planetary transmission device;
a first input gear meshed with the first output gear;
a first transmission shaft for supporting the first input gear;
a first speed range setting clutch corresponding to the first transmission shaft, and having a first state for fixing the first input gear to the first transmission shaft, and a second state for allowing rotation of the first input gear relative to the first transmission shaft;
a second output gear interlocked to the planetary transmission device;
a second input gear meshed with the second output gear;
a second transmission shaft for supporting the second input gear; and
a second speed range setting clutch corresponding to the second transmission shaft, and having a first state for fixing the second input gear to the second transmission shaft, and a second state for allowing rotation of the second input gear relative to the second transmission shaft,
wherein the first and second transmission shafts are arranged in parallel for selectively transmitting drive to the output rotary member; and
wherein each of the first transmission shaft and the second transmission shaft has a friction clutch mounted thereon, thereby allowing a selective transmission of drive from one of the first transmission shaft and the second transmission shaft to the output rotary member.

17. A speed change transmission system having:
a hydrostatic stepless transmission for receiving engine drive; and a planetary transmission device having a plurality of planetary transmission mechanisms for combining output of the hydrostatic stepless transmission and the engine drive not undergoing a speed change action by the hydrostatic stepless transmission;
a combined driving force from the planetary transmission device being stage-divided into a plurality of speed ranges, and subjected to stepless speed changing at each speed range for output from an output rotary member;
the speed change transmission system comprising:
a first output gear interlocked to the planetary transmission device;
a first input gear meshed with the first output gear;
a first transmission shaft for supporting the first input gear;
a first speed range setting clutch corresponding to the first transmission shaft, and having a first state for fixing the first input gear to the first transmission shaft, and a second state for allowing rotation of the first input gear relative to the first transmission shaft;
a second output gear interlocked to the planetary transmission device;
a second input gear meshed with the second output gear;
a second transmission shaft for supporting the second input gear; and
a second speed range setting clutch corresponding to the second transmission shaft, and having a first state for fixing the second input gear to the second transmission shaft, and a second state for allowing rotation of the second input gear relative to the second transmission shaft;
wherein the first output gear and the first input gear have a gear ratio for forming a first speed range; and
the second output gear and the second input gear have a gear ratio for forming a second speed range continuous with the first speed range and faster than the first speed range, and
wherein each of the first transmission shaft and the second transmission shaft has a friction clutch mounted thereon, thereby allowing a selective transmission of drive from one of the first transmission shaft and the second transmission shaft to the output rotary member.

* * * * *

UNITED STATES PATENT AND TRADEMARK OFFICE
CERTIFICATE OF CORRECTION

PATENT NO. : 8,308,597 B2  
APPLICATION NO. : 12/440083  
DATED : November 13, 2012  
INVENTOR(S) : Minoru Hiraoka et al.

Page 1 of 1

It is certified that error appears in the above-identified patent and that said Letters Patent is hereby corrected as shown below:

Column 29, Line 6, Claim 10, delete "ou ut" and insert -- output --

Signed and Sealed this  
Twelfth Day of February, 2013

Teresa Stanek Rea  
*Acting Director of the United States Patent and Trademark Office*